(12) United States Patent
Katano et al.

(10) Patent No.: US 8,673,467 B2
(45) Date of Patent: Mar. 18, 2014

(54) FUEL CELL VEHICLE

(75) Inventors: Koji Katano, Toyota (JP); Hiroshi Arisawa, Susono (JP); Hiroyuki Sekine, Nissin (JP); Ikuhiro Nakamura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/616,144

(22) Filed: Sep. 14, 2012

(65) Prior Publication Data

US 2013/0045398 A1   Feb. 21, 2013

Related U.S. Application Data

(63) Continuation of application No. PCT/JP2011/060533, filed on May 2, 2011.

(51) Int. Cl.
*H01M 14/00*  (2006.01)
*B60K 1/00*  (2006.01)

(52) U.S. Cl.
USPC ............................................ 429/7; 180/65.31

(58) Field of Classification Search
None
See application file for complete search history.

(56) References Cited

U.S. PATENT DOCUMENTS

2004/0101745 A1*  5/2004  Kawasaki et al. ............... 429/96
2006/0102398 A1*  5/2006  Mizuno ......................... 180/65.3
2007/0248861 A1*  10/2007  Hoshi .............................. 429/26
2007/0275276 A1*  11/2007  Saeki et al. ...................... 429/13
2008/0093140 A1*  4/2008  Asai et al. ..................... 180/65.4
2009/0133943 A1*  5/2009  Noguchi et al. ............. 180/65.21
2009/0153284 A1*  6/2009  Chen .............................. 336/220
2010/0079956 A1*  4/2010  Ibori et al. ..................... 361/703

FOREIGN PATENT DOCUMENTS

| JP | 2003-252252 A | 9/2003 |
|---|---|---|
| JP | 2005-129388 A | 5/2005 |
| JP | 2006-160209 A | 6/2006 |
| JP | 2006-327396 A | 12/2006 |
| JP | 2007-015612 A | 1/2007 |
| JP | 2009-303465 A | 12/2009 |
| JP | 2010-260391 A | 11/2010 |
| JP | 2010-274675 A | 12/2010 |
| JP | 2011-018553 A | 1/2011 |
| WO | 2009/150923 A1 | 12/2009 |
| WO | 2010/137147 A1 | 12/2010 |
| WO | 2010/137151 A1 | 12/2010 |

* cited by examiner

*Primary Examiner* — Patrick Ryan
*Assistant Examiner* — Jose Colucci Rios
(74) *Attorney, Agent, or Firm* — Kenyon & Kenyon LLP

(57) ABSTRACT

A fuel cell vehicle includes under a floor of the vehicle: a fuel cell generating electric power through an electrochemical reaction between reaction gases; a fluid supply/discharge unit for the fuel cell; and a converter converting electric power from the fuel cell, the converter being contained in a center tunnel provided, at a center in a vehicle width direction, so as to be curved toward a cabin along a vehicle axis in a front-back direction, the fuel cell and the unit being arranged on a rear side of the vehicle relative to the converter and arranged in the vehicle width direction, wherein the converter is provided to be offset toward the fuel cell with respect to a centerline of the center tunnel along the vehicle axis and to be offset toward the unit with respect to a centerline of the fuel cell along the vehicle axis.

15 Claims, 20 Drawing Sheets

FUEL CELL VEHICLE

This is a Continuation of International Application No. PCT/JP2011/060533 filed on May 2, 2011. The entire disclosure of the prior application[s] is hereby incorporated by reference herein in its entirety.

TECHNICAL FIELD

The present invention relates to a fuel cell vehicle that includes a fuel cell as an energy source.

BACKGROUND ART

In recent years, fuel cell systems that employ, as energy sources, fuel cells that generate electric power through an electrochemical reaction between reactant gases (a fuel gas and an oxidant gas) have been attracting attention. Fuel cell vehicles provided with the fuel cell systems include a fuel cell vehicle in which the fuel cell system is provided under the floor of the vehicle.

Regarding such a technique of providing a system under the floor of the vehicle, a fuel cell vehicle is known in which: a fuel cell stack is contained in a center tunnel as a center console; and auxiliary apparatuses such as a heater and a DC-DC converter, which are respectively connected to the fuel cell stack via piping and wiring, are arranged between center frames and side frames (see, for example, patent document 1).

Patent Document
Patent Document 1: JP2007-015612 A

SUMMARY OF THE INVENTION

Problem to be Solved by the Invention

When a fuel cell converter is arranged between center frames and side frames as described above, the floor level of a vehicle is high, making it difficult to ensure enough space inside the vehicle. In particular, a converter having a reactor has been increasing in size with the increase in power of a fuel cell, which makes it difficult to contain the converter under the floor while enough space inside the vehicle is ensured.

In such a case, the converter may be considered to be contained in the center tunnel. However, it is difficult to comfortably contain the size-increased converter in the center tunnel. Further, where the size-increased converter is contained in the center tunnel, if an impact is applied to the vehicle so that the impact deforms the center tunnel, an inner wall of the center tunnel may come into contact with the converter.

The present invention has been made in light of the above circumstances, and an object of the present invention is to provide a fuel cell vehicle that comfortably contains a converter in a center tunnel and that ensures a large space inside the vehicle.

Means for Solving the Problem

In order to achieve the above object, the present invention provides a fuel cell vehicle, including under a floor of the vehicle: a fuel cell that generates electric power through an electrochemical reaction between reaction gases; a fluid supply/discharge unit for the fuel cell; and a converter that converts electric power from the fuel cell, the converter being contained in a center tunnel provided, at a center in a vehicle width direction, so as to be curved toward a cabin along a vehicle axis in a front-back direction, the fuel cell and the unit being arranged on a rear side of the vehicle relative to the converter and arranged in the vehicle width direction, wherein the converter is provided to be offset toward the fuel cell with respect to a centerline of the center tunnel along the vehicle axis and to be offset toward the unit with respect to a centerline of the fuel cell along the vehicle axis.

According to the vehicle fuel cell system with the above configuration, the converter contained in the center tunnel is offset toward the fuel cell relative to the centerline of the center tunnel along the vehicle axis and is also offset toward the unit relative to the centerline of the fuel cell along the vehicle axis, whereby the pipes, which lead to the radiator and compressor, provided toward the front of the vehicle, can be provided to pass from the unit. Further, the pipes that lead to the converter can be provided to pass on the side opposite the above piping space. Therefore, while the converter is contained in the center tunnel, piping spaces for respectively providing the pipes leading to the unit and the pipes leading to the converter can be ensured with balance on both sides of the converter.

Further, according to the fuel cell vehicle of the invention, in the converter, a reactor, a power module (e.g., IPM) and a control substrate having a control circuit that controls the power module may be arranged in order from below, and a power interrupting device(s) (e.g., a relay that produces a switch-off state via an electric signal to interrupt energization with a power source or/and a so-called service plug that mechanically interrupts energization with a power source by removing components that constitute a part of a circuit via manual operation, etc.) may be arranged in front of the vehicle.

Further, according to the fuel cell vehicle of the invention, a plurality of the reactors may be arranged at intervals (e.g., intervals located vertically in a position in which the reactors are provided in the vehicle), and a cooling flow path may be provided between the reactors.

For example, where a reactor block is provided in which: one or more of the reactors are provided to a reactor case while a part(s) thereof is being exposed to the outside; and cooling fins are provided to a surface of the reactor case which is located opposite a surface thereof on which the reactor(s) is exposed, the cooling fins of a plurality of the reactor blocks may be arranged opposite each other so that the cooling flow path is formed between the cooling fins.

Further, according to the fuel cell vehicle of the invention, a bus bar module integrated with bus bars connected to the reactors may be provided on one side of the reactors, and the bus bar module may be provided with a current sensor.

Further, according to the fuel cell vehicle of the invention, a coolant port for the cooling flow path may be arranged opposite the bus bar module.

Further, according to the fuel cell vehicle of the invention, coolant distribution parts that distribute a coolant may be provided outside coils that respectively constitute the reactors and on both sides in the vehicle width direction.

Further, according to the fuel cell vehicle of the invention, a cross member of the vehicle may be arranged above a joining part between the converter and the fuel cell.

Further, according to the fuel cell vehicle of the invention, the converter may be formed to taper down, at least on a side opposite a joining side with the fuel cell, toward a longitudinal direction end of the converter.

Further, according to the fuel cell vehicle of the invention, the reactors may be energized beginning with a lowest-temperature reactor.

Further, according to the fuel cell vehicle of the invention, the reactors may be energized beginning with a highest-temperature reactor.

Further, according to the fuel cell vehicle of the invention, a reactor at a temperature with which copper loss of the reactor is a minimum and efficiency of the power module is a maximum may be selected to be energized.

Effect of the Invention

According to the fuel cell vehicle of the invention, the converter can comfortably be contained in the center tunnel, and a large space inside the vehicle can be ensured.

DESCRIPTION OF REFERENCE NUMERALS

Figure 1:
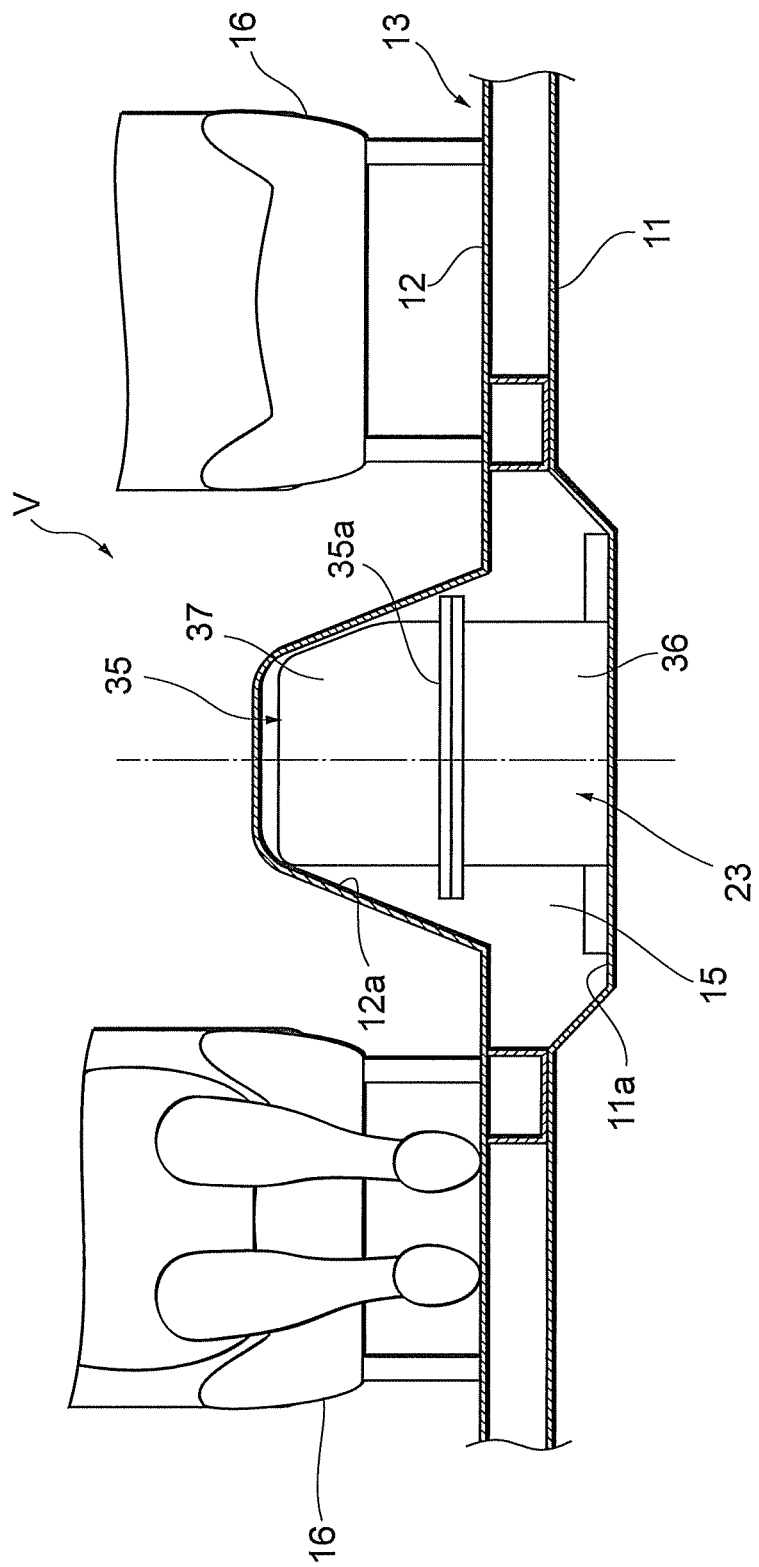
FIG. 1 is a schematic cross-sectional view of a fuel cell vehicle in a vehicle width direction according to an embodiment.

15: center tunnel
21: fuel cell
22: fluid supply/discharge unit (unit)
23: FC converter
30: joining part
31: cross member
41: reactor part (reactor)
42: IPM
43: control substrate
44: junction box (relay, service plug)
83: reactor
87: cooling flow path
91: bus bar module
93: bus bar
99: current sensor
101: coolant port (port for a coolant)
103: coolant distribution part
X: converter centerline
Y: tunnel centerline (centerline of a center tunnel)
Z: stack centerline (centerline of a fuel cell)

MODE FOR CARRYING OUT THE INVENTION

Embodiments of a fuel cell vehicle according to the present invention will be described below.

Figure 21:
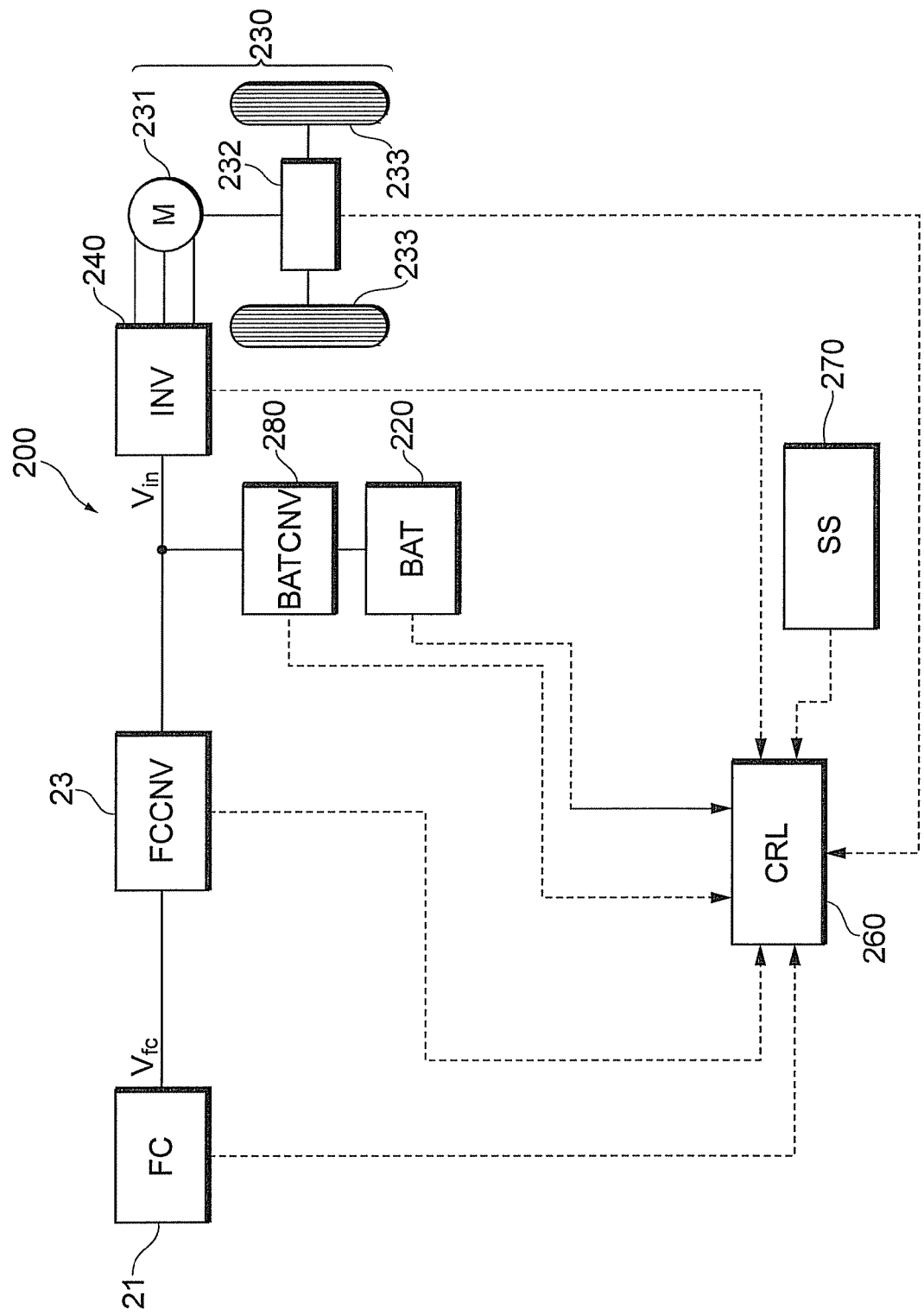
FIG. 21 is a system configuration diagram of a fuel cell system provided in a fuel cell vehicle.

FIG. 21 is a diagram illustrating a system configuration example of a fuel cell system 200 provided in a fuel cell vehicle V according to an embodiment of the invention.

A fuel cell 21 is, for example, a polymer electrolyte fuel cell, which includes a cell stack (cell stack body) in which a plurality of cells (power generation cells) is stacked. A voltage sensor for detecting an output terminal voltage Vfc from the cell stack and a current sensor for detecting an output current (FC current) (the sensors being omitted in the figure) are attached to the fuel cell 21.

The cells are each constituted by: an electrolyte membrane made of an ion-exchange membrane; a membrane-electrode assembly (MEA) constituted of a pair of electrodes which sandwich both surfaces of the electrolyte membrane; and a pair of separators which sandwich, from the outside, the membrane-electrode assembly therebetween. Each of the separators is a conductor formed of, e.g., metal serving as a base material, and has fluid flow paths for supplying an oxidant gas (reactant gas) such as air and a fuel gas (reactant gas) such as a hydrogen gas to the respective electrodes, which interrupts the mixing of different fluids respectively supplied to adjacent cells. Such a configuration causes an electrochemical reaction in the membrane-electrode assembly in each cell, and an electromotive force is thus produced. Although not shown in the figure, the separators are provided with manifolds for respectively flowing the oxidant gas, the fuel gas and a coolant (oxidant-gas manifold, fuel-gas manifold and coolant manifold) in a cell-stacking direction.

A converter that increases an output voltage from the cell stack in the fuel cell 21 (hereinafter referred to as the FC converter) 23 has a role of controlling the output terminal voltage Vfc of the fuel cell 21, and is a bidirectional voltage converter that converts (increases or decreases) the FC output terminal voltage Vfc input to a primary side (input side, fuel cell 21 side) to have a voltage value different from the primary side and outputs it to a secondary side (output side, inverter 240 side), and conversely converts a voltage input to the secondary side to have a voltage different from the secondary side and outputs it to the primary side. The FC converter 23 controls the output terminal voltage Vfc of the fuel cell 21 to be a voltage in accordance with a target output (i.e., target output terminal voltage vfc).

A battery (power storage device) 220 is connected in parallel with the fuel cell 21 with respect to a load 230, and functions as a storage source of surplus power, a storage source of regenerated energy during regeneration braking, and an energy buffer during a load variation as a result of acceleration or deceleration of the fuel cell vehicle V. The battery 220 is constituted of, for example, a secondary battery such as a nickel/cadmium battery, a nickel/hydrogen battery or a lithium secondary battery.

A battery converter 250, which is connected between the battery 220 and the inverter 240, has a role of controlling an input voltage Vin of the inverter 240, and has the same circuit configuration as that of, e.g., the FC converter 23.

The inverter 240 is, for example, a PWM inverter driven by a pulse width modulation method. In accordance with a control command provided by a controller (control device) 260, the inverter 240 converts direct-current power output from the fuel cell 21 or the battery 220 to three-phase alternating current power, thereby controlling a rotation torque of a traction motor 231.

The traction motor 231 serves as the main motive power of the fuel cell vehicle V, and it also generates regenerative power during deceleration. A differential 232 is a decelerator, decelerating a high-speed rotation of the traction motor 231 to a predetermined rotation frequency and rotating a shaft to which tires 233 are provided. The shaft has a wheel speed sensor (not shown), etc., thereby detecting the vehicle speed, etc., of the fuel cell vehicle V. In this embodiment, all the equipment (including the traction motor 231 and the differential 232) operable upon receiving power supplied from the fuel cell 21 is collectively referred to as the load 230.

The controller 260 is a computer system for controlling the fuel cell system 200, and has a CPU, RAM, ROM, etc. The controller 260 receives, as inputs, various signals (e.g., a signal representing an acceleration opening degree, a signal representing a vehicle speed, and a signal representing an output current or output terminal voltage of the fuel cell 21) supplied from a sensor group 270, and obtains the power required from the load 230 (i.e., the power required for the entire system).

The power required from the load 230 corresponds to the total value of, for example, vehicle travel power and auxiliary-apparatus power. The auxiliary-apparatus power includes, e.g., power consumed by vehicle-mounted auxiliary apparatuses (humidifier, air compressor, hydrogen pump, cooing water circulation pump, etc.), power consumed by devices necessary for vehicle traveling (change gear, wheel control device, steering device, suspension device, etc.), and power consumed by devices arranged in an occupant space (air-conditioning device, illumination device, audio equipment, etc.).

The controller 260 determines an output power distribution ratio of the fuel cell 21 and the battery 220 and computes a power generation command value. The controller 260 calculates the power required for the fuel cell 21 and the battery 220, and then controls the operations of the FC converter 23 and the battery converter 280 in order to obtain the above required power. In order to obtain a target torque in accordance with an acceleration opening degree, the controller 260 outputs, for example, an AC voltage command value as a switching command to the inverter 240, and controls the output torque and revolution speed of the traction motor 231.

Next, an embodiment of a fuel cell vehicle provided with the fuel cell system 200 will be described.

Figure 2:
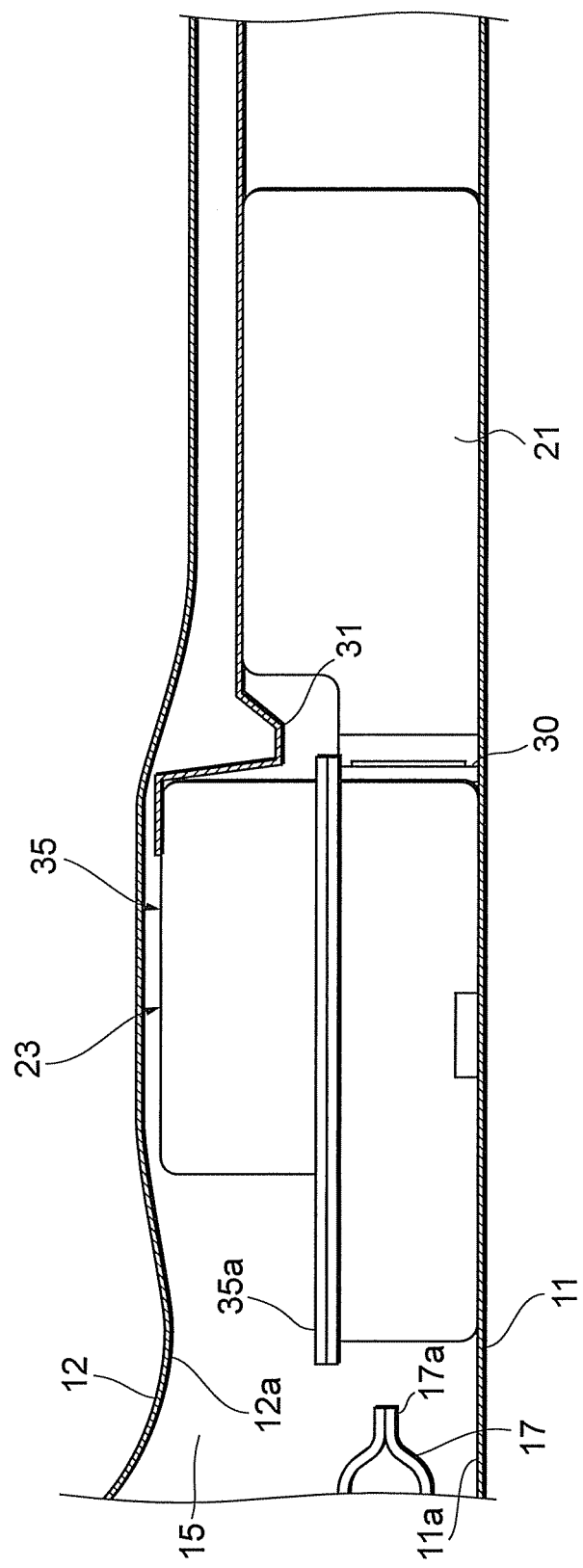
FIG. 2 is a schematic cross-sectional view of the fuel cell vehicle in a front-back direction according to the embodiment.

As shown in FIGS. 1 and 2, in the fuel cell vehicle V according to this embodiment, a floor 13 of the fuel cell vehicle V is constituted by a bottom plate 11 and a floor plate 12. In a center part in the vehicle width direction of the fuel cell vehicle V, the bottom plate 11 is provided with a concave part 11a that is concave downward (on the side opposite a cabin), and the floor plate 12 is formed with a convex part 12a that protrudes upward (toward the cabin).

Further, in the center part of the fuel cell vehicle V in the vehicle width direction, a center tunnel 15, which is formed by the concave part 11a and the convex part 12a, is provided along the front-back direction of the fuel cell vehicle V, and sheets 16 are provided, on the right and left sides of the center tunnel 15, on a top surface of the floor 13.

Figure 3:
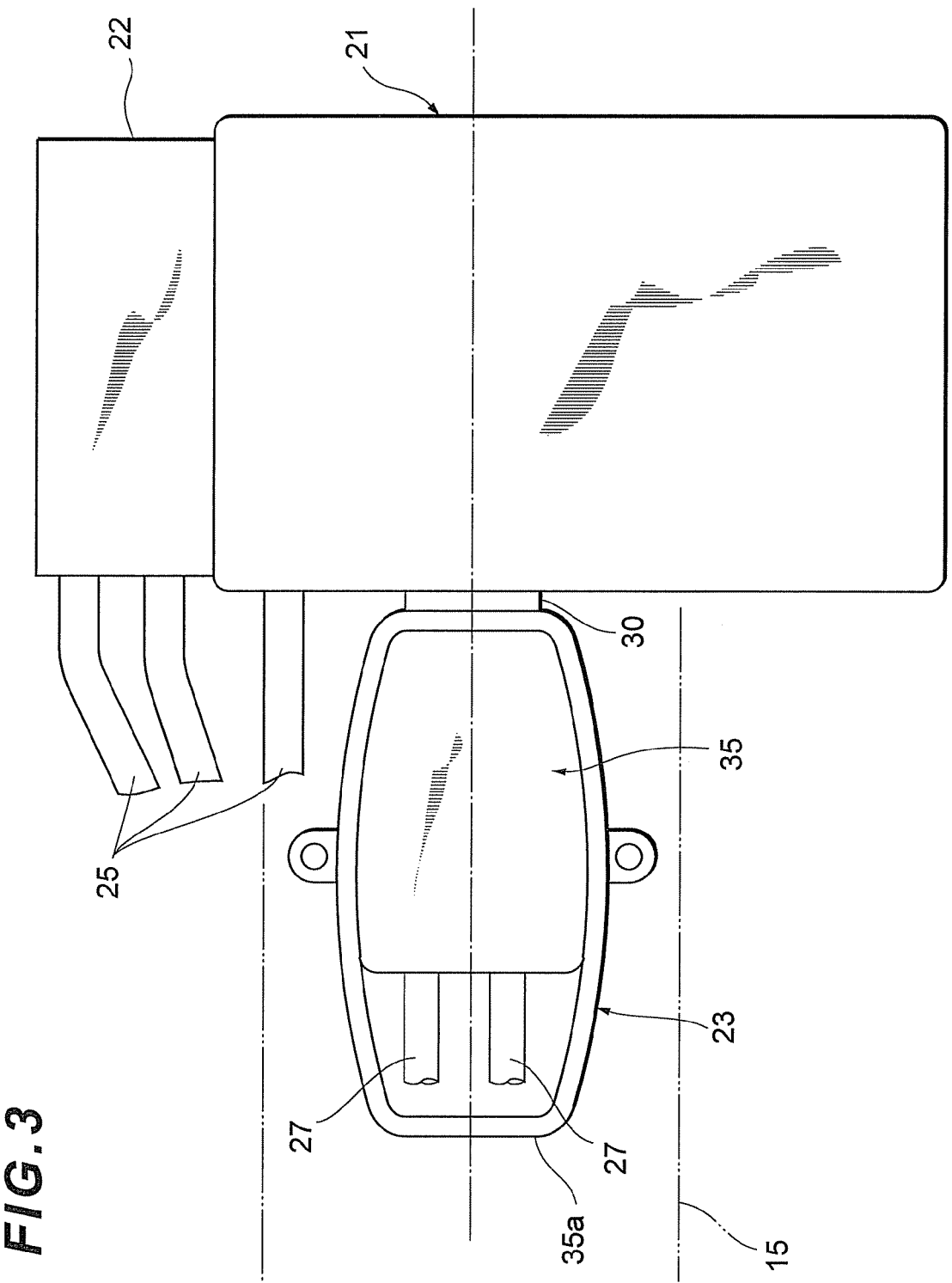
FIG. 3 is a schematic plan view illustrating a part of a fuel cell system provided in the fuel cell vehicle.

As shown in FIG. 3, the center tunnel 15 contains the fuel cell 21, the fluid supply/discharge unit 22 for the fuel cell 21, and the FC converter 23 that converts power of the fuel cell 21. The fuel cell 21 is provided in the fuel cell vehicle V such that the cell-stacking direction is aligned with the vehicle width direction (vertical direction in FIG. 3). Note that the fluid supply/discharge unit 22 is provided, at an end of the fuel cell 21 in the cell-stacking direction, so as to be integral with the fuel cell 21.

One of the ends of each of: an oxidant gas supply pipe for supplying oxidant gas to the fuel cell 21; an oxidant-off gas discharge pipe for guiding oxidant-off gas discharged from the fuel cell 21 to the outside; a fuel gas supply pipe for supplying fuel gas from a fuel gas tank to the fuel cell 21; a circulation pipe for returning fuel-off gas discharged from the fuel cell 21 to the fuel gas supply pipe; a fuel-off gas discharge pipe that branches off from the circulation pipe; a coolant supply pipe for supplying a coolant to the fuel cell 21; a coolant discharge pipe for supplying a coolant discharged from the fuel cell 21 to a radiator, etc., is collectively connected to the fluid supply/discharge unit 22. The fluid supply/discharge unit 22 includes: an air compressor; a fuel gas pump; various valves such as a cutoff valve, a regulator and a discharge valve; an injector; various sensors such as a temperature sensor and a pressure sensor; a fluid (gas-liquid separator), etc., which are provided to the respective pipes.

As described above, the fuel cell vehicle V according to this embodiment has a structure in which the fuel cell 21, the fluid supply/discharge unit 22 and the FC converter 23 are arranged on the lower side of the floor plate 12 of the fuel cell vehicle V, i.e., under the floor.

As shown in FIG. 3, the FC converter 23 is arranged toward the front (left in FIG. 3) of the fuel cell vehicle V, and the fuel cell 21 and the fluid supply/discharge unit 22 are arranged, to be aligned in the vehicle width direction, toward the back (right in FIG. 3) of the fuel cell vehicle V relative to the FC converter 23. Thus, the fuel cell 21 provided with the FC converter 23 and the fluid supply/discharge unit 22 forms a substantially T shape arrangement in a plan view.

An engine compartment at a front part of the fuel cell vehicle V contains the traction motor 231 and the inverter 240, and power generated in the fuel cell 21 is supplied to the inverter 240 via the FC converter 23. The fuel cell vehicle V travels with a driving force of the traction motor 231.

Figure 4:
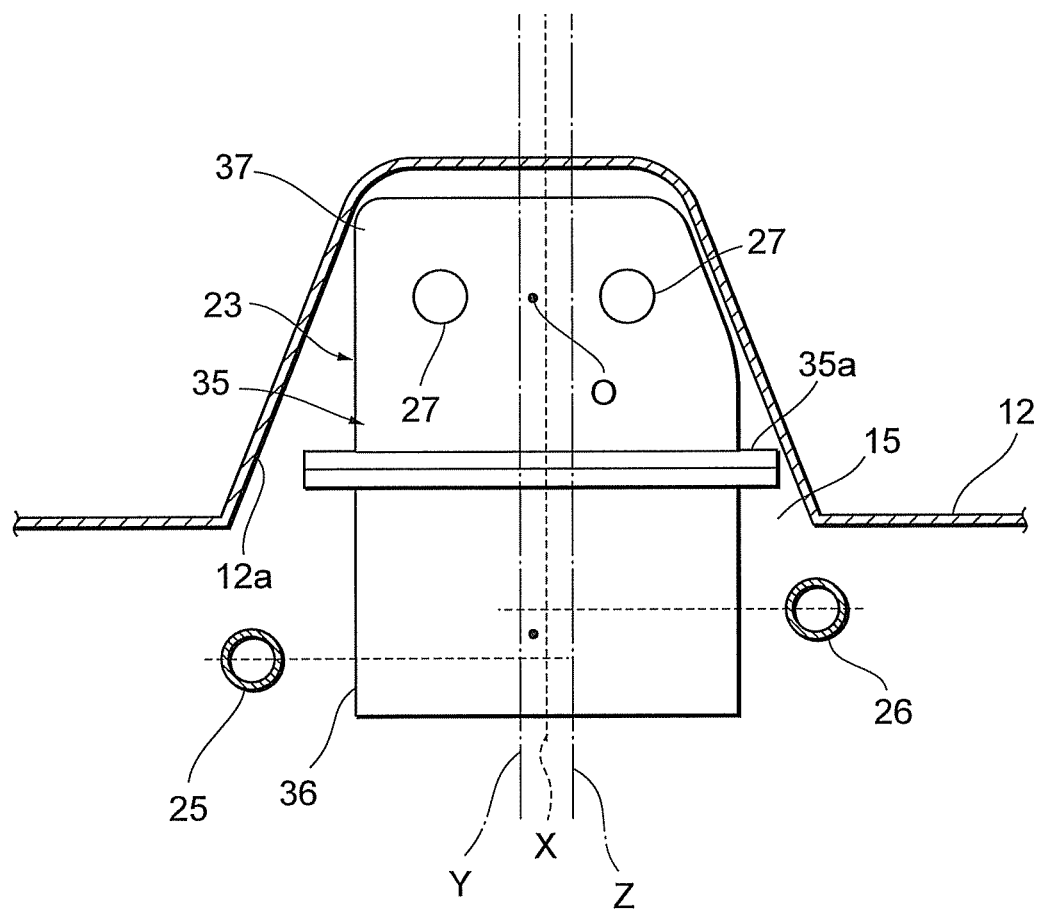
FIG. 4 is a cross-sectional view of a center tunnel taken at a part where a converter is provided.

As shown in FIG. 4, the FC converter 23 contained in the center tunnel 15 is provided such that a converter centerline X as the centerline of the FC converter 23 is offset toward the fuel cell 21 (left in FIG. 4) relative to a tunnel centerline Y as the centerline of the center tunnel 15 along the vehicle axis and also is offset toward the fluid supply/discharge unit 22 (right in FIG. 4) relative to a stack centerline Z as the centerline of the fuel cell 21 along the vehicle axis.

As a result, on both sides of the FC converter 23 in the center tunnel 15, piping spaces for the unit pipes 25, which lead from the fluid supply/discharge unit 22 to the radiator, compressor, etc., on the fuel cell vehicle V front side can be ensured.

Further, on the opposite side to the fluid supply/discharge unit 22, converter pipes 26 for a coolant are connected to the FC converter 23. The converter pipes 26 are drawn from the FC converter 23 toward the front of the fuel cell vehicle V.

The FC converter 23 in the center tunnel 15 is arranged as described above, whereby piping spaces for arranging the unit pipes 25 and the converter pipes 26 can be ensured with balance on both sides of the FC converter 23.

Figure 5:
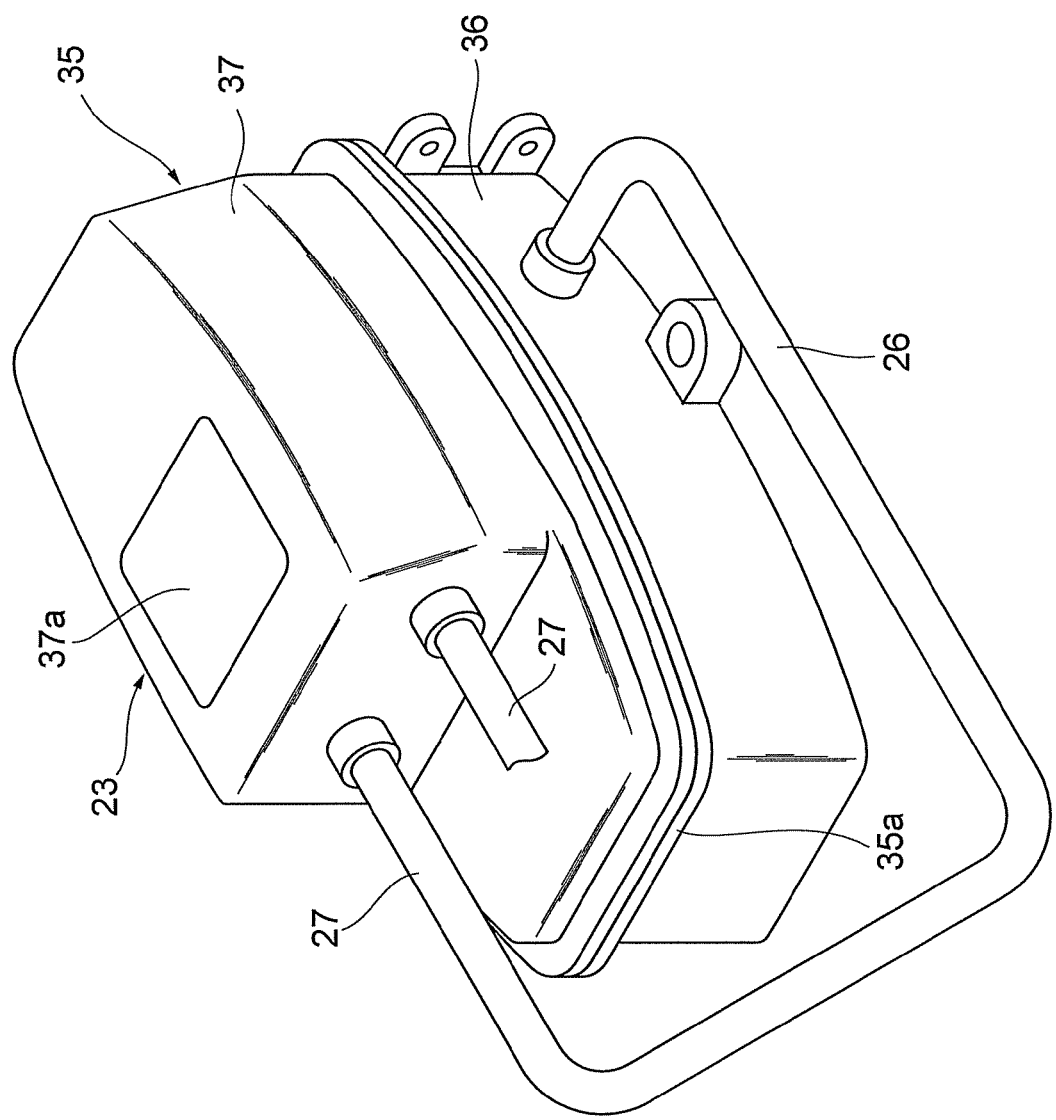
FIG. 5 is a perspective view illustrating the outer appearance of the converter.

Further, as shown in FIGS. 3 and 5, the FC converter 23 is designed to have a shape, in a plan view, in which: it tapers down toward the front and the back in a longitudinal direction thereof; and an intermediate part thereof in the back-and-forth direction (longitudinal direction) relatively swells. This prevents an inner wall of the center tunnel 15 from coming into contact with the FC converter 23 even when, for example, an impact is laterally applied to the fuel cell vehicle V so that the center tunnel 15 is deformed. In order to attain such a shape, the FC converter 23 is provided, toward the front, with a junction box 44 which has a relay and a service plug as relatively small components and which will be described below.

Further, as shown in FIG. 4, a pair of IPM cooling pipes 27 for supplying a coolant to the IPM (power module) 42, which constitutes a part of the FC converter 23, is connected to an upper part of a front end surface of the FC converter 23. The IPM cooling pipes 27 are arranged to be bilaterally symmetric with respect to an intermediate point O arranged between the tunnel centerline Y and the converter centerline X. The IPM cooling pipes 27 arranged as described above are not too close to the inner wall of the center tunnel 15 and are arranged with balance, since the FC converter 23 has the shape in a plan view in which: it tapers down toward the front and the back in a longitudinal direction thereof; and an intermediate part thereof in the back-and-forth direction relatively swells. Thus, even when an impact is laterally applied to the fuel cell vehicle V so that the center tunnel 15 is deformed, the center tunnel 15 is prevented from coming into contact with the IPM cooling pipes 27.

As shown in FIG. 5, the FC converter 23 is contained in a case 35. The case 35 is designed to have a two-piece structure constituted by a lower case 36 and an upper case 37. The lower case 36 is covered with the upper case 37.

Figure 6:
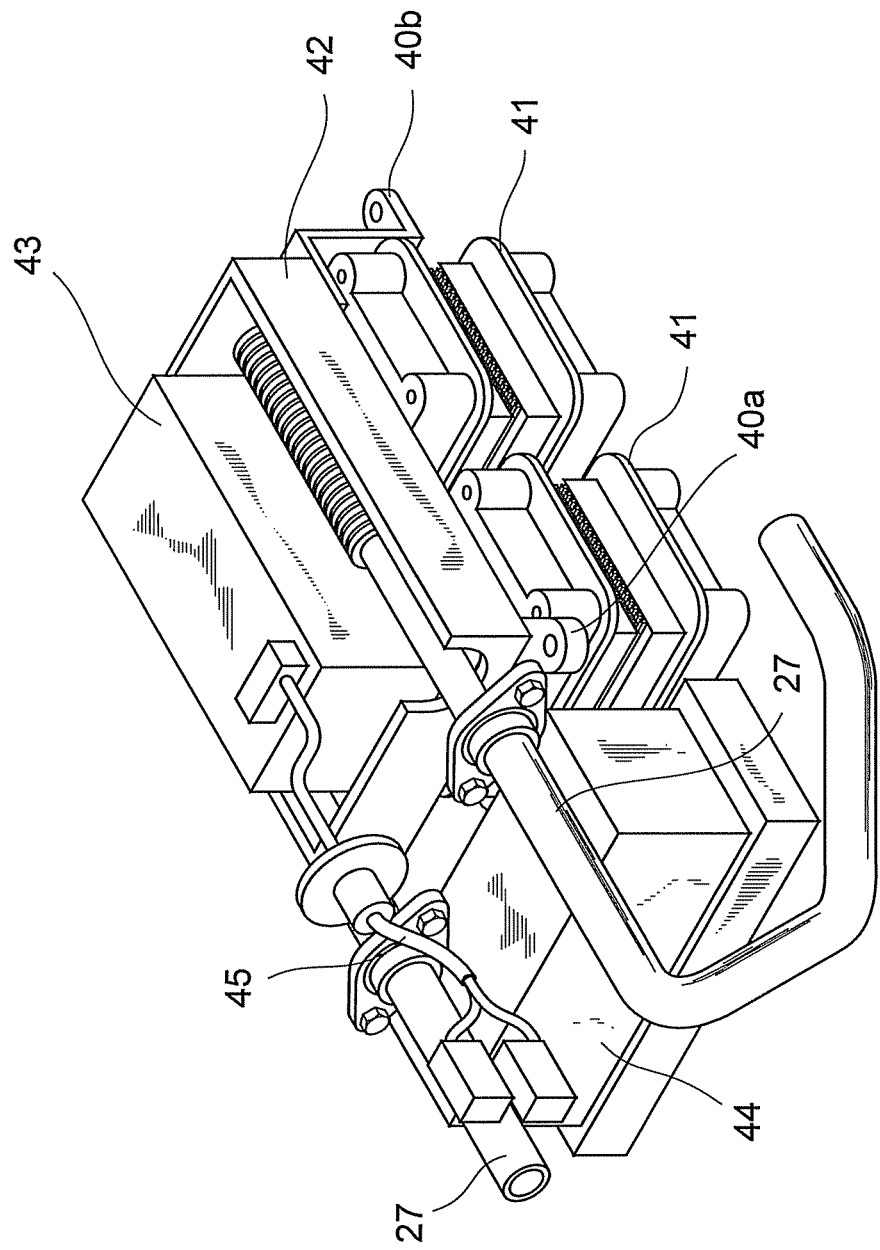
FIG. 6 is a perspective view illustrating the internal structure of the converter.

As shown in FIG. 6, the FC converter 23 includes reactor parts 41, the IPM (Intelligent Power Module) 42, a control substrate 43 and the junction box 44. The IPM 42 includes, for example, a power device such as a power MOSFET that controls power or an insulated-gate bipolar transistor (IGBT); a drive circuit for the power device; and a self-protection function, and the control substrate 43 includes a control circuit that controls the IPM 42.

The reactor parts 41 are heavy in weight and large, and thus are arranged at the lowermost part of the FC converter 23 so as to be arranged at a part below the center tunnel where a space is ensured relatively easily. Further, the center gravity of the fuel cell vehicle V can be lowered by arranging the heavy reactor parts 41 at the lowermost part. The FC converter 23 then has a structure in which the IPM 42 is arranged to be stacked on the reactor parts 41. Thus, downsizing can be attained by connecting the reactor parts 41 and the IPM 42 through bus bar modules 91, which will be described below, and further, a reduction in the length of each of bus bars 93 that constitute each of the bus bar modules 91 can be attained.

The IPM 42 is provided with integrally-formed foot parts 40a at two positions below parts where the IPM cooling pipes 27 are drawn, and the foot parts 40a are directly fixed to the lower case 36 with bolts, etc. Further, parts below the parts opposite the parts where the IPM cooling pipes 27 are drawn are fixed to the lower case 36 via joining members 40b with bolts, etc. As described above, the integrally-formed foot parts 40a are provided at at least the two positions below the parts where the IPM cooling pipes 27 are drawn, and the foot parts 40a are directly fixed to the lower case 36. Therefore, the IPM 42 can be fixed at a predetermined position with high precision.

The control substrate 43 is arranged to be stacked on the IPM 42. The junction box 44 is arranged in front of the IPM 42, the junction box 44 containing: the relay that produces a switch-off state via an electric signal to interrupt energization with a power source; and the so-called service plug that mechanically interrupts energization with a power source by removing components that constitute a part of a circuit via manual operation, etc.

The control substrate 43 is arranged on the IPM 42, whereby noise influence from the reactor parts 41 on the control substrate 43 can be suppressed as much as possible. Further, the control substrate 43 is arranged on the IPM 42, i.e., at the uppermost part of the FC converter 23, whereby wiring of a wire harness 45 can be facilitated during incorporation into the case 35, and in addition, a waterproofing effect can be increased against water that splashes from below during traveling. Further, as shown in FIG. 5, the upper case 37 is provided with an openable/closable maintenance lid 37a. By opening this maintenance lid 37a, wiring and maintenance of the wire harness 45 with respect to the control substrate 43 arranged at the uppermost part can be carried out easily.

Regarding the FC converter 23, a division plane between the lower case 36 and the upper case 37, which constitute the case 35, is positioned between the reactor parts 41 and the IPM 42. Thus, while the reactor parts 41 are contained in the lower case 36, the bus bars 93 of the bus bar modules 91 provided to the reactor parts 41 can be laterally fastened to the IPM 42 with fastening bolts with ease.

Figure 7:
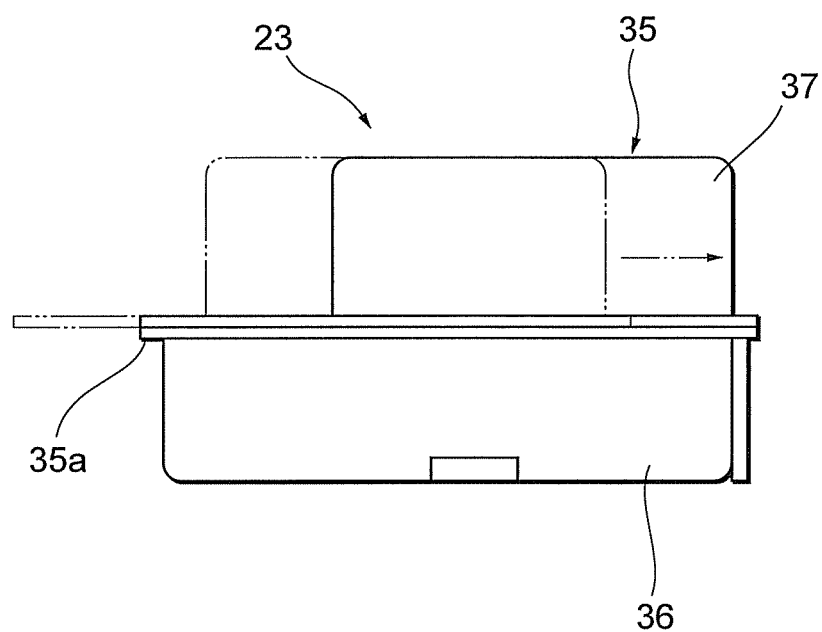
FIG. 7 is a side view explaining a case of the converter.

Further, the division plane between the lower case 36 and the upper case 37 is designed to be above the level of a top surface of the reactor parts 41. With this configuration, as shown in FIG. 7, even when the upper case 37 is overlaid on the lower case 36 and is then slid in order to mount the upper case 37 on the lower case 36, a defect that the upper case 37 comes into contact with reactors 83, which constitute the reactor parts 41 and will be described below, so that an insulating layer as a surface of each of the reactors 83 is damaged during such a mounting task, can be eliminated.

Further, in the FC converter 23, the junction box 44 is arranged toward the front, and thus, wiring of the FC converter 23 with respect to the inverter 240 provided toward the front of the fuel cell vehicle V can be facilitated.

Further, as shown in FIG. 2, the lower case 36 and the upper case 37 are joined, at the division plane, with a flange part 35a. The flange part 35a is arranged to be above the level of a flange part 17a of a suspension member 17 of the fuel cell vehicle V which is provided on the vehicle front side relative to the FC converter 23. With such an arrangement, even when an impact is applied to the fuel cell vehicle V from in front thereof, and the suspension member 17 is then deformed toward the back of the fuel cell vehicle V, it can become difficult for the flange part 17a of the suspension member 17 to come into contact with the flange part 35a where the lower case 36 and the upper case 37 are joined.

Further, when incorporating the junction box 4 in the lower case 36 from above, this is not hindered by the flange part 17a of the suspension member 17. Note that the junction box 44 is incorporated in the lower case 36 from above as described above, and thus, it is preferable that the flange part 35a where the lower case and the upper case 37 are joined is larger than the flange part 17a of the suspension member 17 which is arranged below the level of the flange part 35a.

As shown in FIG. 2, the fuel cell 21 and the FC converter 23 are joined to each other via a joining part 30. The joining part 30 is designed to be below the levels of the fuel cell 21 and the FC converter 23, and a reinforcing cross member 31, which is provided along the vehicle width direction of the fuel cell vehicle V, is arranged above the joining part 30 designed to be at a low level. Thus, the height position of the cross member 31 can be kept at a low level, leading to the sheets 16 reduced in height, whereby a large space inside the vehicle can be ensured.

Figure 8:
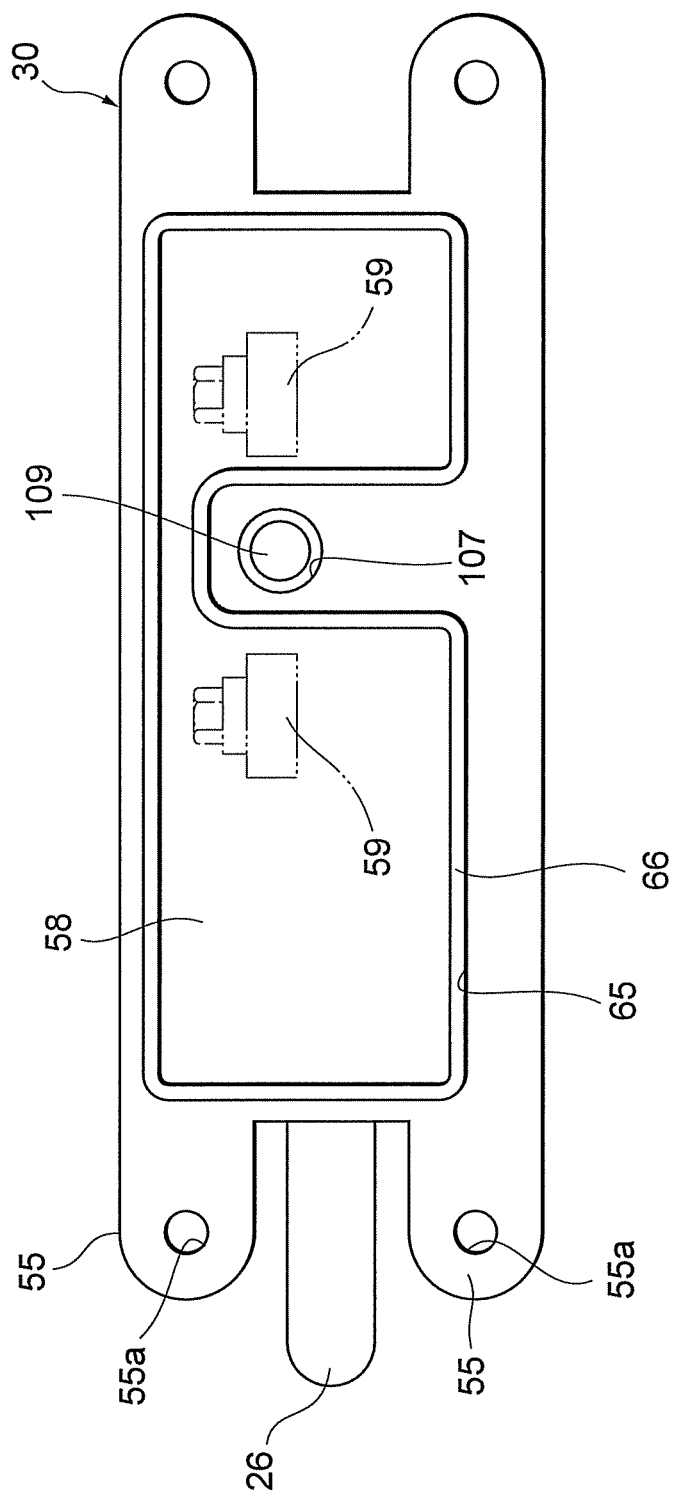
FIG. 8 is a front view of a part where the converter is joined to a fuel cell.

In particular, as shown in FIG. 8, the FC converter 23 is provided with flange parts 55 that join the FC converter 23 to the fuel cell 21. The flange parts 55 are arranged so as to extend only laterally in the joining part 30, which can eliminate an upward protuberance of the joining part 30. Thus, the height position of the cross member 31 can be kept at a lower level.

Note that other cross members 31 are arranged on the vehicle front side relative to the FC converter 23 and on the vehicle back side relative to the fuel cell 21. The above cross members 31 protect the entire fuel cell system 200 against an impact applied to the fuel cell vehicle V.

Further, the converter pipes 26 are arranged in terms of the height between bolt through holes 55a of the flange parts 55 that laterally extend from the joining part 30, and thus are designed not to become an obstacle when fastening bolts (omitted) are inserted into the bolt through holes 55a from the FC converter 23 side to be fastened by a fastening tool in order to join the fuel cell 21 and the converter 23.

Figure 9:
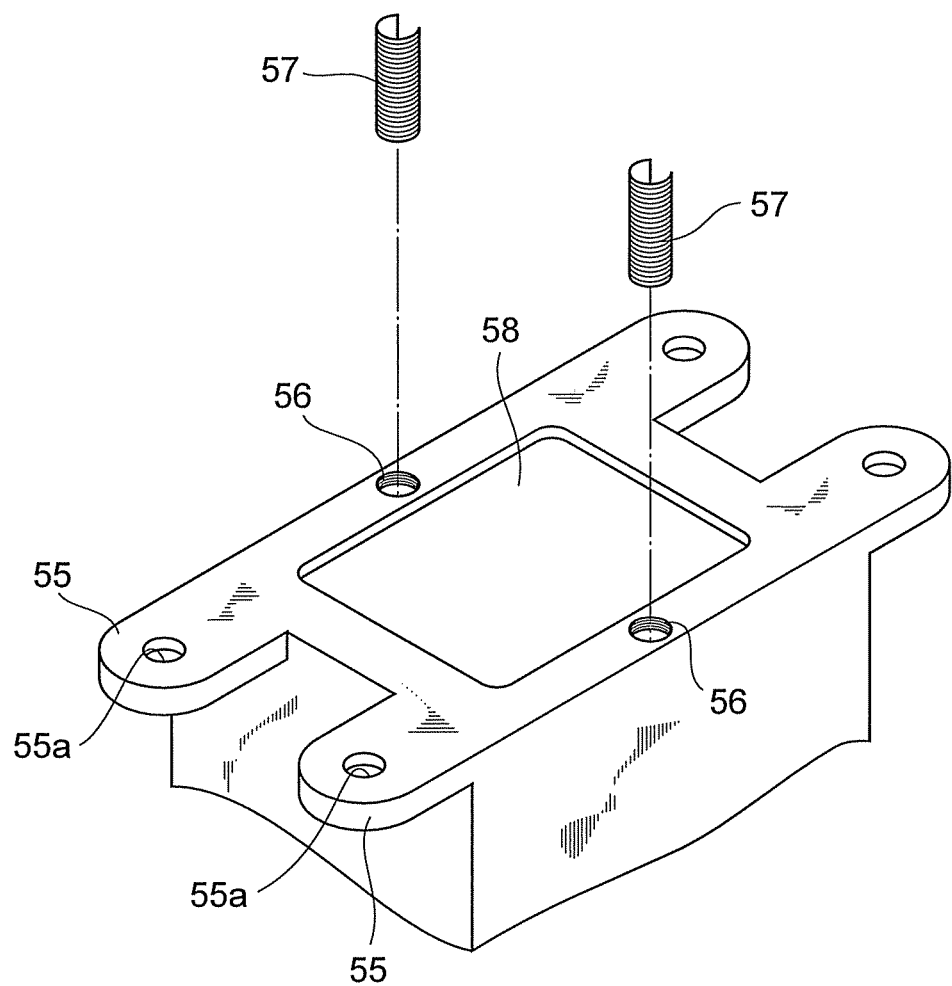
FIG. 9 is a perspective view of a part where the converter is joined to the fuel cell.

Further, it is preferable that: the flange parts 55 of the FC converter 23 which attain joining with the fuel cell 21 are provided, at center parts thereof in the width direction, with hole parts 56; and C-shape knock-pins 57 are inserted into the hole parts 56, as shown in FIG. 9. Thus, the joining task between the fuel cell 21 and the FC converter 23 can be facilitated, and also, a noise reduction effect can be enhanced.

Figure 10:
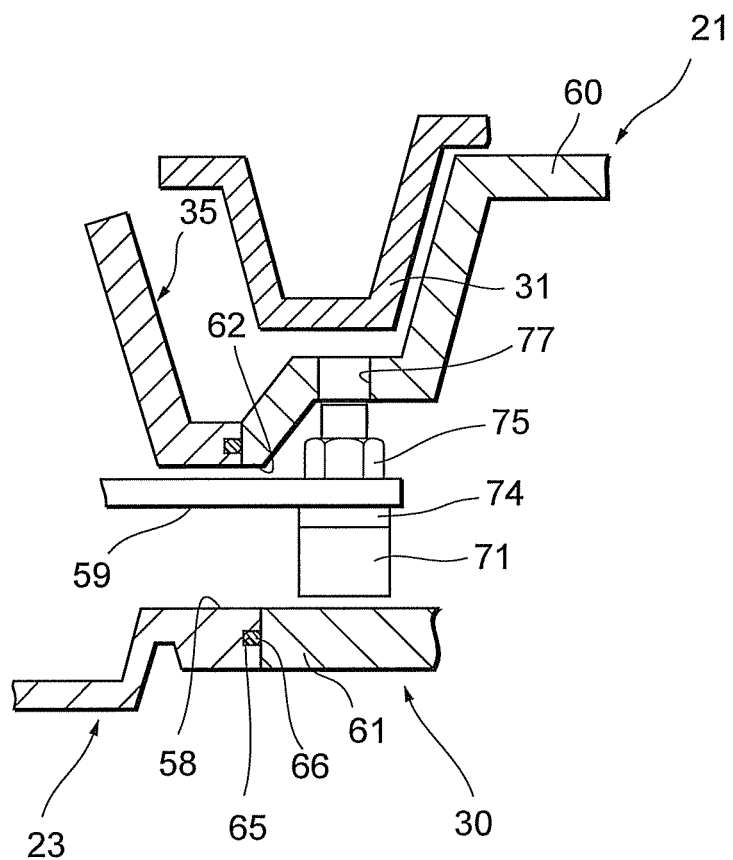
FIG. 10 is a cross-sectional view of a part where the converter is joined to the fuel cell.

As shown in FIGS. 8 and 10, an opening part 58 is formed at a part of the case 35 for the FC converter 23 which is joined to the fuel cell 21, and a pair of connection bus bars 59 extends toward the fuel cell 21 through the opening part 58. The flange parts 55 of the FC converter 23 are mated with flange parts 61 provided to a case 60 for the fuel cell 21. In this state, the flange parts 55 and 61 are fastened to each other with fastening bolts, whereby the respective cases 35 and 60 for the FC converter 23 and the fuel cell 21 are joined to each other.

Further, an opening part 62 is formed at a part of the case 60 for the fuel cell 21 which is joined to the FC converter 23. Thus, when the FC converter 23 and the fuel cell 21 are joined, the respective opening parts 58 and 62 of the FC converter 23 and the fuel cell 21 communicate with each other. A gasket 66 fitted in a seal groove 65 is provided in an end surface of the flange parts 55 of the FC converter 23. This gasket 66 seals the joining part 30 between the FC converter 23 and the fuel cell 21.

Figure 11:
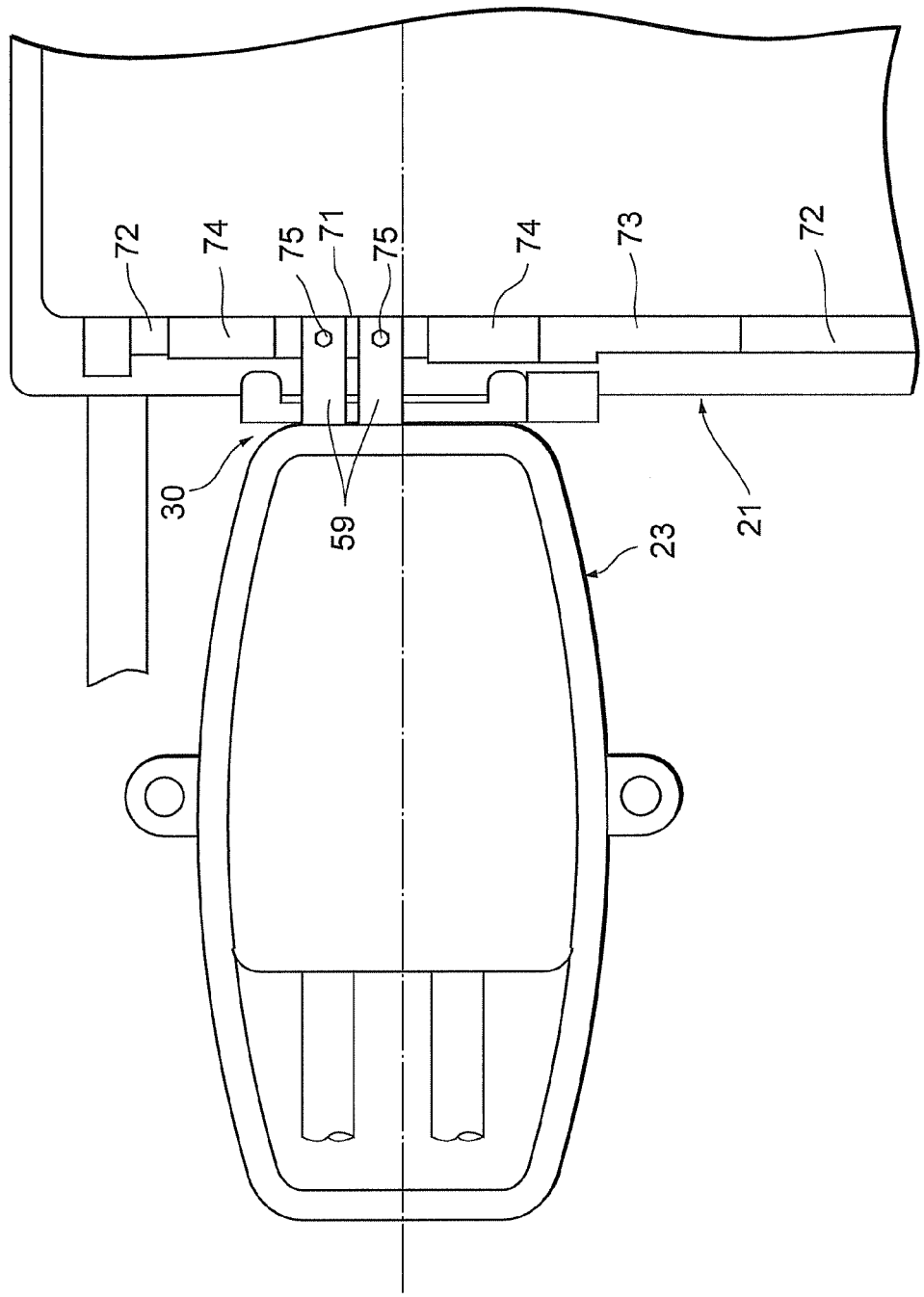
FIG. 11 is a plan view illustrating the internal structure of a part where the converter is joined to the fuel cell.

As shown in FIGS. 10 and 11, the fuel cell 21 is provided with a terminal strip 71 in the vicinity of the opening part 62. Further, the fuel cell 21 has right and left terminal parts 72 (one and the other in the cell-stacking direction). One of the terminal parts 72 is connected to a flexible bus bar 74 with flexibility through an extension bus bar 73 while the other terminal part 72 is directly connected to another flexible bus bar 74 with flexibility. Ends of the respective flexible bus bars 74 connected to the terminal parts 72 are arranged on the terminal strip 71. Further, the connection bus bars 59 of the FC converter 23 are arranged on the terminal strip 71, on which the ends of the flexible bus bars 74 have been arranged, and the connection bus bars 59 are fastened from above with fastening bolts 75. Thus, the connection bus bars 59 of the FC converter 23 are connected to the terminal strip 71, so that conduction is established between the connection bus bars 59 and the flexible bus bars 74.

Here, the FC converter 23 is offset relative to the stack centerline Z as the centerline of the fuel cell 21, and thus, as shown in FIG. 11, the connection bus bars 59 of the FC converter 23 are also offset relative to the stack centerline Z. The terminal strip 71 connected to the connection bus bars 59 is shifted from the stack centerline Z in accordance with the positions of the connection bus bars 59. Thus, the terminal strip 71 is close to the one terminal part 72. Therefore, the terminal strip 71 and the terminal part 72 close to each other can be connected only via the flexible bus bar 74 without using any extension bus bar 73, and further, the length of the flexible bus bar 74 can be shortened. This reduction in length of the flexible bus bar 74 reduces the amount of shift, which can attain downsizing without the need of ensuring a peripheral space and can reduce costs resulting from the reduction in the number of extension bus bars 73 used.

As shown in FIG. 10, the case 60 for the fuel cell 21 is provided with an openable/closable tool hole 77 at a position above the terminal strip 71, and the task of fastening the connection bus bars 59 to the terminal strip 71 using the fastening bolts 75 can be facilitated via the tool hole 77. This tool hole 77 is formed at an upper part of the case 60 for the fuel cell 21, and thus can easily enhance a waterproofing effect against water that splashes from below during traveling.

Further, the case 35 for the FC converter 23 has a height dimension larger than that of the joined part of the case 60 for the fuel cell 21, of which height dimension is designed to be small in order to avoid the cross member 31. Therefore, if the terminal strip 71 is provided to the FC converter 23, a part of the case 35 for the FC converter 23 which is joined to the fuel cell 21 needs to be extended toward the fuel cell 21 in order to have a small height dimension, leading to an increased dimension of the FC converter 23 in the vehicle front-back direction.

Meanwhile, as described above, when the terminal strip 71 is arranged on the fuel cell 21 side and the tool hole 77 is provided to the case 60 for the fuel cell 21 the dimension of the FC converter 23 in the vehicle front-back direction can be reduced, and further, the utilization of the space in the center tunnel 15 can be enhanced. Further, the distance between the tool hole 77 and the terminal strip 71 can be made small to facilitate the task of connecting the connection bus bars 59 with the fastening bolts 75. Furthermore, such a structure can prevent interference between the gasket 66 of the flange parts 55 of the case 35 and the tool hole 77 without increasing the dimension of the case 35 for the FC converter 23 in the vehicle front-back direction.

Figure 12:
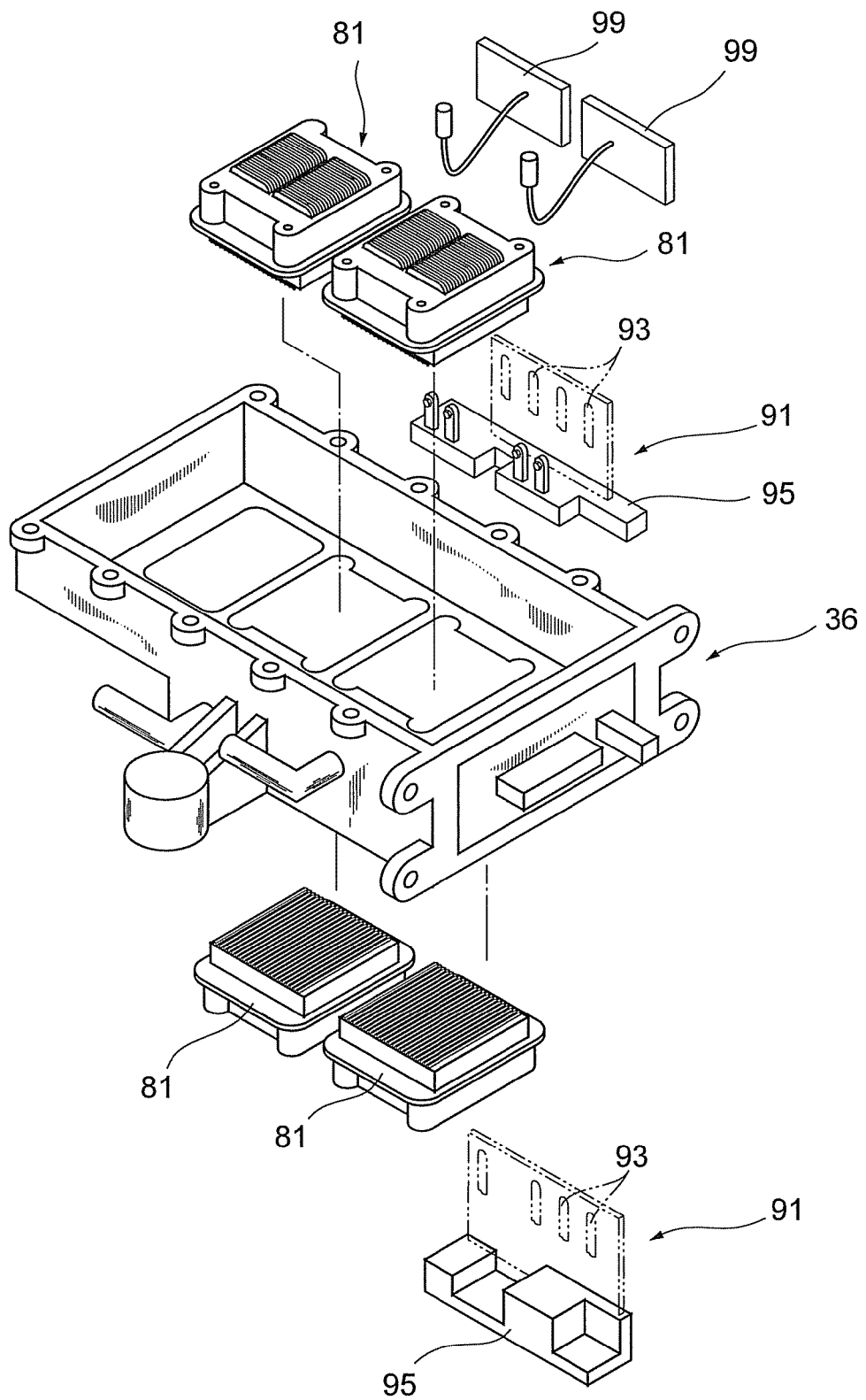
FIG. 12 is an exploded perspective view of reactor parts assembled into a lower case of the converter.
Figure 13:
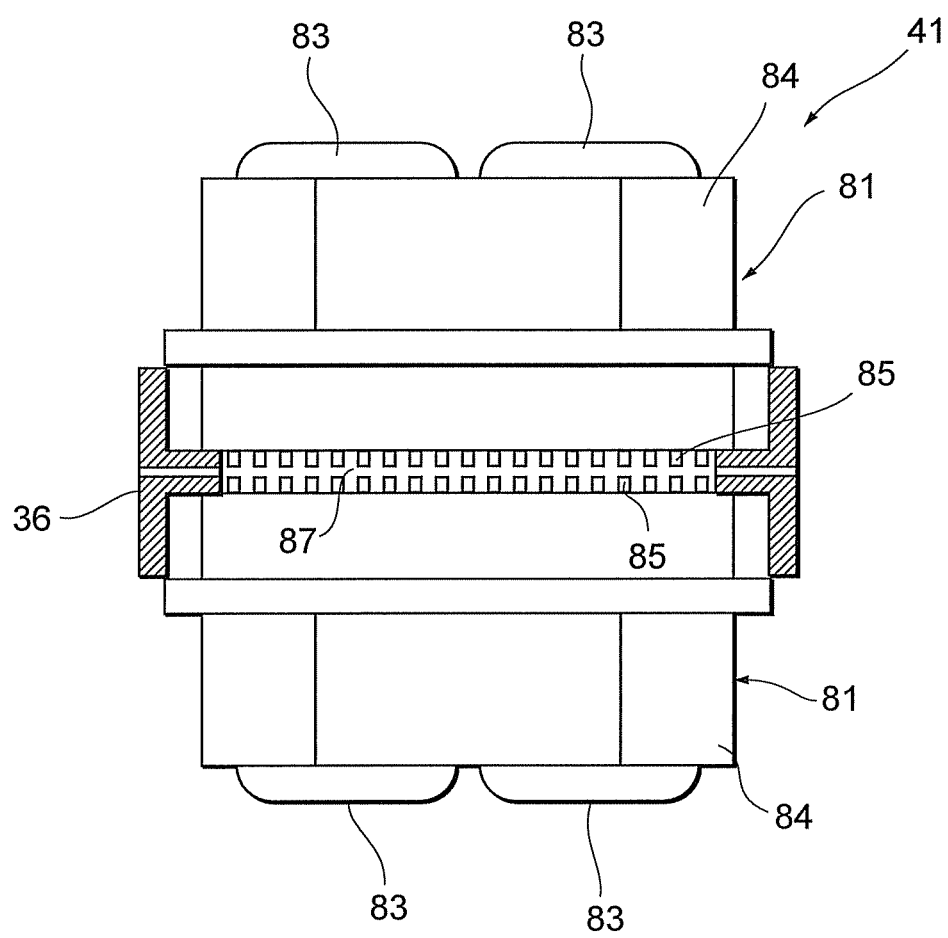
FIG. 13 is a side view illustrating the structure of the reactor part.

Regarding the reactor parts 41, which constitute a part of the FC converter 23, two reactor parts are arranged in the lower case 36 in the front-back direction of the fuel cell vehicle V. As shown in FIGS. 12 and 13, each of the reactor parts 41 is constituted by reactor blocks 81 that are attached from above and below the lower case 36.

Figure 14:
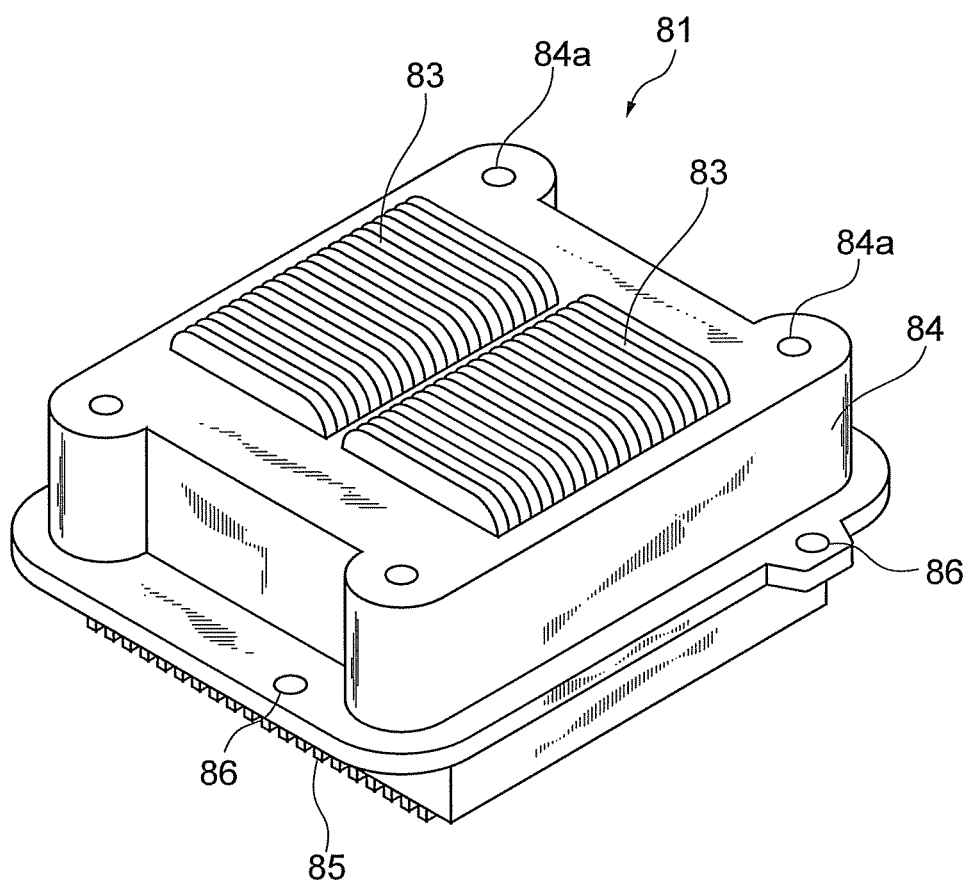
FIG. 14 is a perspective view of a reactor block that constitutes the reactor part.

As shown in FIG. 14, each of the reactor blocks 81 is designed such that one or more (two in this embodiment) reactors 83 are provided to a reactor case 84 in the state where parts of the reactors 83 are exposed to the outside. The reactor case 84 is provided with, on a back surface thereof (in the reactor case 84, a surface positioned opposite a surface on which the reactors 83 are exposed), cooling fins 85. Further, the reactor case 84 is provided with fixing screw holes 86. As shown in FIGS. 12 and 13, the reactor blocks 81 are fastened to the lower case 36 by inserting bolts (omitted) into the fixing screw holes 86 from the front side and the back side of the lower case 36 while the respective surfaces of the reactor blocks 81 on which the cooling fins 85 are provided face one another, so that the reactor blocks 81 are fixed to the lower case 36; thus, the reactor parts 41 are configured. When the reactor blocks 81 are fixed to the lower case 36 as described above, cooling flow paths 87 each are formed between the cooling fins 85 of the reactor blocks 81.

A coolant is delivered to the cooling flow paths 87 through the converter pipes 26, and thus the reactors 83 of each of the reactor blocks 81 are cooled so that the heat resistance of the reactors 83 is reduced. As a result, the number of heat sinks can be reduced to half the number for the case where the reactor blocks 81 are arranged in a plane, which can attain weight reduction. Further, stacking the reactor blocks 81 can reduce the occupation area in a plan view, and the reactors can be preferable for being provided to the FC converter 23 that is contained in the narrow center tunnel 15. Further, fastening screw holes 84a for fixing the reactors 83 are formed at the four corners of each of the reactor blocks 81, and the reactors 83 are fixed to the cooling fins 85 by inserting bolts (omitted) into the fastening screw holes 84a.

With the above structure, potting of the reactors 83 to the small reactor case 84 can be carried out, which can reduce facility cost due to the downsizing of equipment such as a curing oven for potting. Further, the potting of the reactors 83 to the small reactor case 84 can eliminate the need for using the curing oven twice as in the case of potting of the reactors 83 to both surfaces of the reactor case 84.

Figure 15:
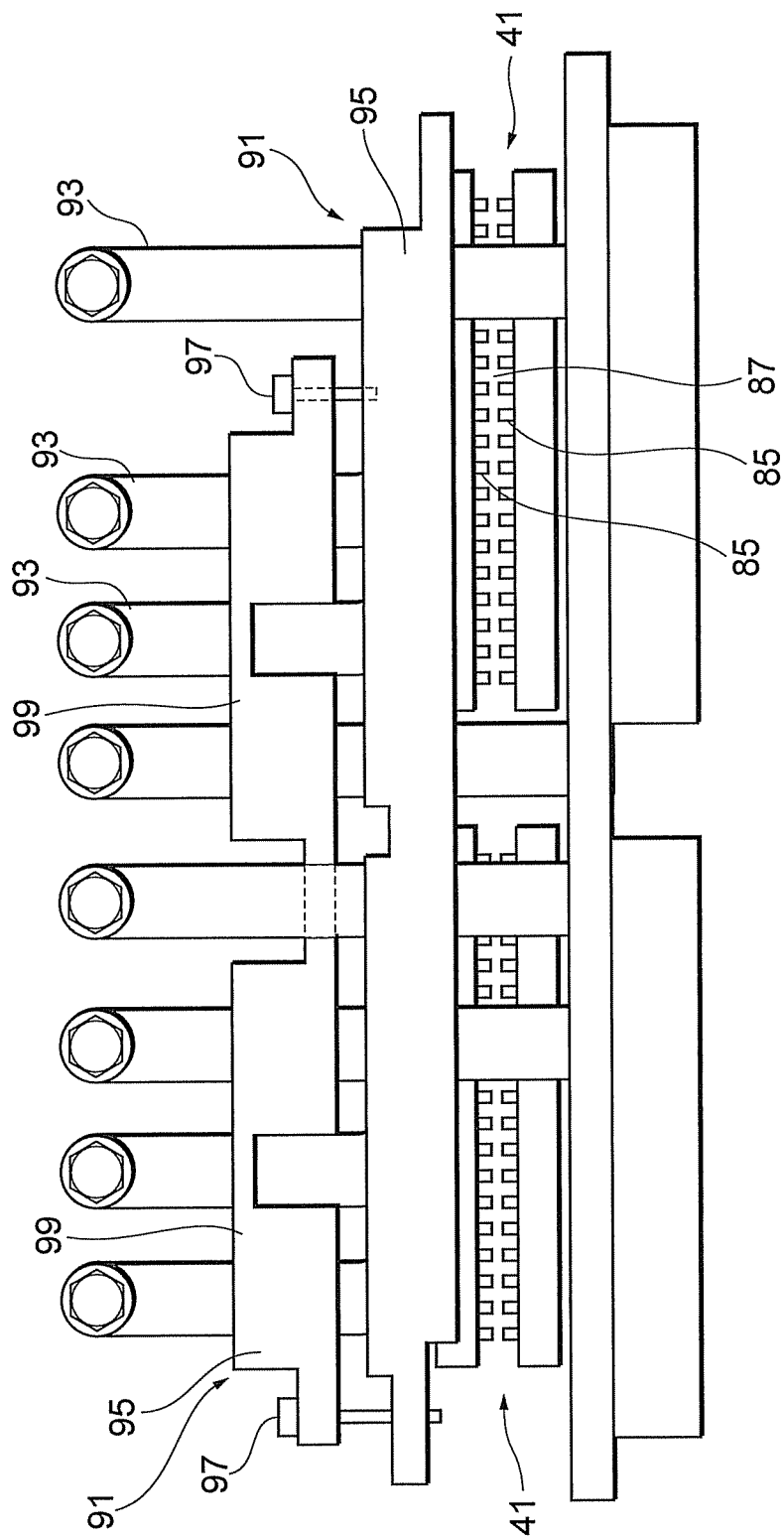
FIG. 15 is a side view of the reactor parts illustrating bus bar modules mounted to the reactor parts.

Further, as shown in FIGS. 12 and 15, the two bus bar modules 91 are provided one above the other on one side of the FC converter 23, which corresponds to one side of the reactor parts 41. The bus bar modules 91 each have four bus bars 93 extending upward in the region indicated by the chain double-dashed line in FIG. 2, and the bus bars 93 are integrated with a mold part 95 made of insulating resin.

Further, regarding the reactor parts 41, the terminal parts of the reactors 83 provided to each of the reactor blocks 81 are arranged on one side of the FC converter 23, which corresponds to one side of the reactor parts 41. The bus bars 93 in one of the bus bar modules 91 are connected to the terminal parts of the reactors 83 of the reactor blocks 81 arranged on the lower stage; meanwhile, the bus bars 93 in the other bus bar module 91 are connected to the terminal parts of the reactors 83 of the reactor blocks 81 arranged on the upper stage. The bus bars 93 connected to the terminal parts of the reactors 83 are then connected to a P bus bar 121, which is provided to the IPM 42 and is described below.

As described above, the terminal parts of the reactors 83 in the reactor parts 41 are collectively arranged on one side of the FC converter 23. Therefore, the task of connecting the bus bars 93 in modules to the terminal parts of the reactors 83 can be carried out easily from one side of the FC converter 23.

Note that the mold parts 95 in the respective bus bar modules 91 are provided with positioning pins 97 that are capable of connecting the bus bar modules 91 positioned to each other, whereby, even with the structure in which the bus bars 93 (8 bars in this embodiment) are collectively arranged on one side of the FC converter 23, assembling of the bus bar modules 91 via positioning can attain easy assembling of the bus bars 93 via positioning at predetermined positions at intervals.

Further, the FC converter 23 includes two current sensors 99 each of which detects a value of a current flowing through the bus bars 93, and the current sensors 99 are attached to the bus bar module 91. Providing the current sensors 99 to the bus bar module 91 can attain easy assembling and space saving.

Further, the current sensors 99 are provided, on the IPM 42 side, in the reactor parts 41. Providing the current sensors 99 on the IPM 42 side can shorten the length of the bus bars 93 provided between the reactor parts 41 and the IPM 42 as much as possible. For example, if the current sensors 99 are provided below the reactor parts 41, the bus bars 93 will be extended downward and then bent to be extended upward for connection with the current sensors 99, leading to the increase in length and complication of the bus bars 93.

Figure 16:
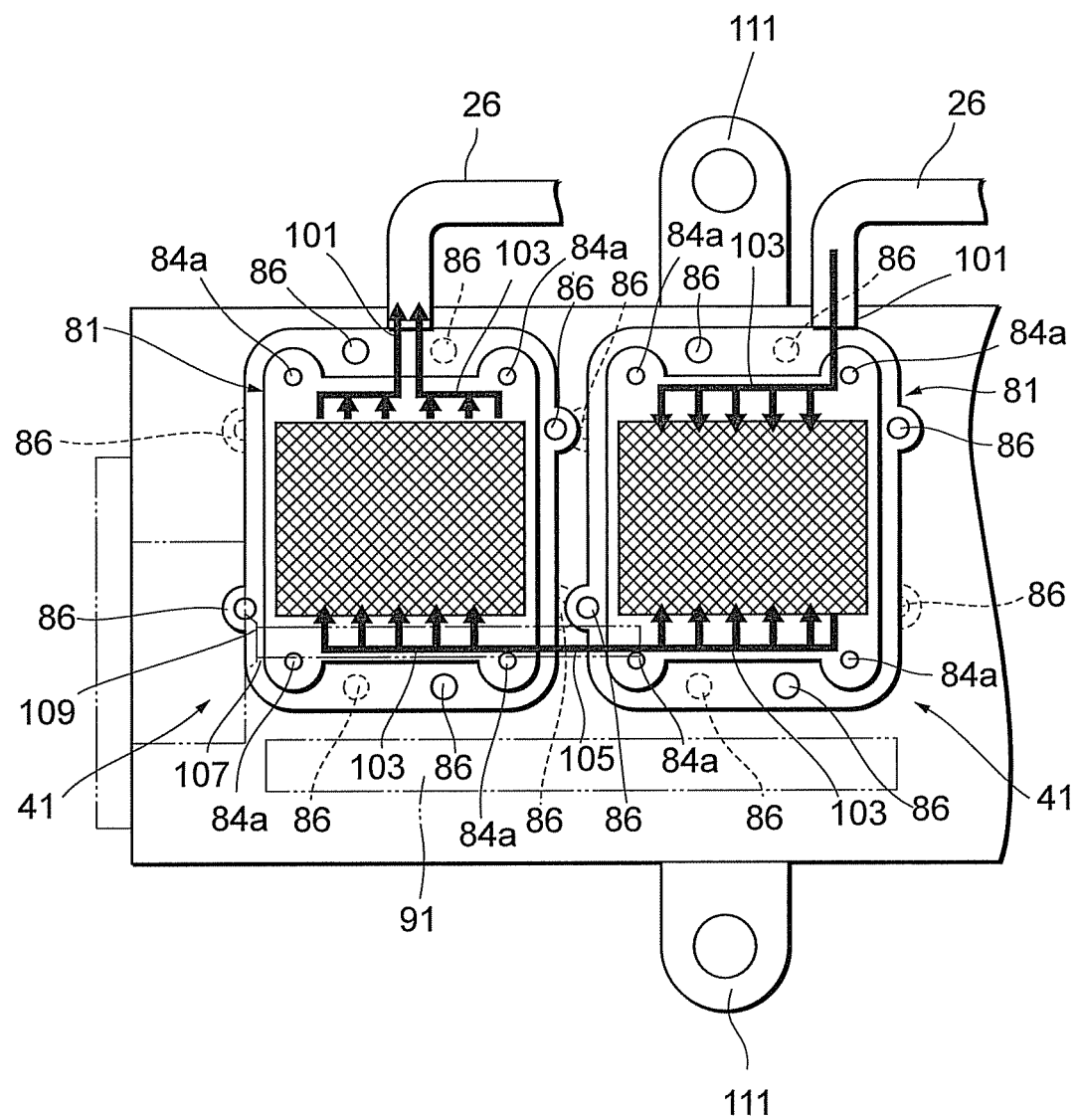
FIG. 16 is a back view of the reactor parts which explains the arrangement, etc., of the reactor parts.

Further, as shown in FIG. 16, in the reactor parts 41, coolant water ports 101 connected to the converter pipes 26 communicating with the cooling flow paths 87 are connected, are arranged opposite the side where the bus bar modules 91 are arranged. Thus, the length of the reactor parts 41 in the vehicle front-back direction can be made as small as possible, and the total length of the FC converter 23 in the vehicle front-back direction can also be shortened. Consequently, while the FC converter 23 and the suspension member 17 on the vehicle front side relative to the FC converter are contained in the center tunnel 15, a large spacing between the two can be ensured. Thus, even if an impact is applied to the fuel cell vehicle V from in front of the vehicle so that the suspension member 17 is displaced toward the back of the fuel cell vehicle V, the suspension member 17 can be prevented from coming into contact with the FC converter 23.

Further, in each of the reactor parts 41, coolant distribution parts 103 for distributing a coolant to the cooling flow paths 87 are provided, on both sides of the fuel cell vehicle V in the vehicle width direction, outside the reactors 83 that constitute the reactor part 41. The coolant distribution parts 103 are provided between fastening screw holes 84a of the reactor case 84 that constitutes the reactor block 81, which attains miniaturization.

On the opposite side to the coolant ports 101, the coolant distribution parts 103 of the reactor parts 41 are made to communicate with each other through a communicating path 105. Thus, the coolant that flows in through the coolant port 101 is distributed in the width direction by the inlet-side coolant distribution part 103 of one of the reactor parts 41 arranged in the front-back direction of the fuel cell vehicle V, then flows through the cooling flow path 87, and then flows to the outlet-side coolant distribution part 103. Further, the coolant passes through the communicating path 105, is distributed in the width direction by the inlet-side coolant distribution part 103 of the other reactor part 41, flows through the cooling flow path 87, and then flows to the outlet-side coolant distribution part 103 to be delivered via the coolant port 101. Consequently, the reactors 83 in the reactor parts 41 are cooled uniformly with high cooling efficiency.

Further, the communicating path 105 is formed to have the coolant distribution parts 103 in the reactor parts 41 arranged in the front-back direction of the fuel cell vehicle V communicate with each other, whereby the communicating path 105 functions as a coolant distribution part, and thus the pressure loss during circulation of the coolant can be reduced.

In order to form the communicating path 105 that has the coolant distribution parts 103 in the reactor parts 41 communicate with each other, drilling is carried out with a drill, etc., from the side of the connection to the fuel cell 21. At this point, the coolant distribution part 103 in the reactor part 41 on the connection side to the fuel cell 21 is formed with, on the connection side to the fuel cell 21, a hole 107. Thus, a waterproof cap 109 is fitted into the hole 107 to be sealed.

The hole 107 sealed with the waterproof cap 109 is arranged outside the circumference of the gasket 66 provided to the opening part 58 of the case 35, as shown in FIG. 8. This arrangement enables the sealed state of the waterproof cap 109 in the hole 107 to be checked visually and easily. Further, the hole 107 sealed with the waterproof cap 109 may be arranged inside the circumference of the gasket 66. When a coolant leaks from the hole 107, this arrangement can prevent the coolant from leaking to the outside of the FC converter 23.

Note that the drilling for forming the communicating path 105 may be carried out from the junction box 44 on the vehicle front side, or integral molding with the communicating path 105 may be carried out via die casting.

Further, as shown in FIG. 16, the converter pipe 26 in the reactor part 41 on the vehicle front side which is remote from the fuel cell 21 is arranged on the side distant from the fuel cell 21. Further, mounts 111 for fixing the FC converter 23 to the fuel cell vehicle V are provided at substantially the center of the reactor part 41 on the vehicle front side. Thus, the mounts 111 can be arranged at the positions that sandwich the center of gravity of the FC converter 23, and also, a fastening task that is carried out from above for fixing the mounts 111 can be facilitated.

The reactor cases 84 which respectively constitute the reactor blocks 81 share a common shape. When two reactor parts 41 each of which is constituted by two stacked reactor blocks 81 are arranged, the spacing between the lower reactor blocks 81 of the respective reactor parts 41 arranged in the vehicle front-back direction is designed to be wider than the spacing between the upper reactor blocks 81. That is, the reactor blocks 81 are spaced as much as possible on the lower side where the connection bus bars 59, etc., are not provided so that a space can be ensured relatively easily, and this reduces the influence due to noise from the reactors 83 as much as possible.

Figure 17:
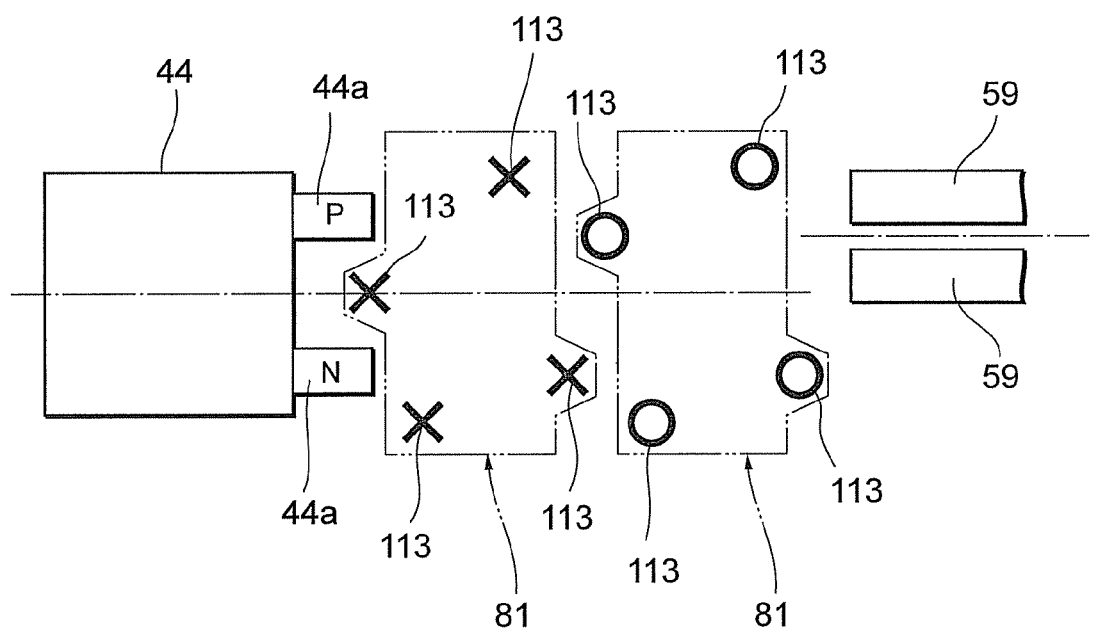
FIG. 17 is a schematic plan view of the reactor parts which illustrates the arrangement, etc., of fixed parts of the reactor parts.

Further, the fixing screw holes 86 provided to the reactor cases 84 that constitutes the reactor blocks 81 are arranged in a staggered manner. Therefore, as shown in FIG. 17, in the upper reactor blocks 81 of the respective reactor parts 41 arranged in the vehicle front-back direction, fixing parts 113 with the fixing screw holes 86 are arranged so as to lap over each other in the vehicle front-back direction.

Further, on the fuel cell 21 side toward the vehicle back, the fixing parts 113 of the reactor blocks 81 on the fuel cell 21 side lap over the offset connection bus bars 59 in the vehicle front-back direction.

Further, one of the fixing part 113 of the reactor blocks 81 on the junction box 44 side laps over the junction box 44 on the vehicle front side in the vehicle front-back direction while the fixing part 113 is interposed between junction bus bars 44a drawn from the junction box 44. Thus, the spacing between the reactor blocks 81 can be reduced on the side where the upper reactor blocks 81 are provided, and further, the spacings of the reactor blocks 81 with respect to the connection bus bars 59 and with respect to the junction box 44 can be reduced. Accordingly, space saving can be attained by decreasing the dimension in the vehicle front-back direction.

As a result, the length of the FC converter 23 in the vehicle front-back direction can be shortened, whereby a large spacing can be ensured between the FC converter 23 and the suspension member 17 on the vehicle front side relative to the FC converter 23. Accordingly, even if an impact is applied to the fuel cell vehicle V from in front of the vehicle so that the suspension member 17 is displaced toward the back of the fuel cell vehicle V, the suspension member 17 can be prevented from coming into contact with the FC converter 23.

In the FC converter 23 having the above structure, a coolant is first delivered to the reactor parts 41 arranged on the lower side, and is then delivered to the IPM 42 arranged above the reactor parts 41. Thus, the coolant is flown from below to above, whereby even if the coolant is mixed with air, the air can be removed smoothly.

Further, if at high temperatures, the efficiency of the reactors 83 decreases with the increase of copper loss. Thus, when the reactors 83 are energized, it is preferable that the reactors 83 are controlled so as to be energized beginning with a lowest-temperature reactor. However, the efficiency of the IPM 42 tends to increase with a higher-temperature reactor. Therefore, when considering the efficiency of the IPM 42, it is preferable that the reactors 83 are controlled so as to be energized beginning with a highest-temperature reactor.

From the above, it is preferable that energization of the reactors 83 are controlled by selecting from a map prepared in advance, or obtaining via computation, etc, a reactor that attains a combination of the minimum copper loss of the reactor 83 and the maximum efficiency of the IPM 42.

Note that the temperatures of the reactors 83 can be measured by thermistors or obtained from an energization history.

Further, regarding control over energization of the reactors 83, the reactors 83 may be energized beginning with the reactor with the shortest bus bar 93. That is, the shortest bus bar 93 has the lowest inductance; thus, when energization is carried out beginning with the reactor with the shortest bus bar 93, a surge voltage can be reduced, which can reduce the copper loss to attain the improvement of efficiency.

Figure 18:
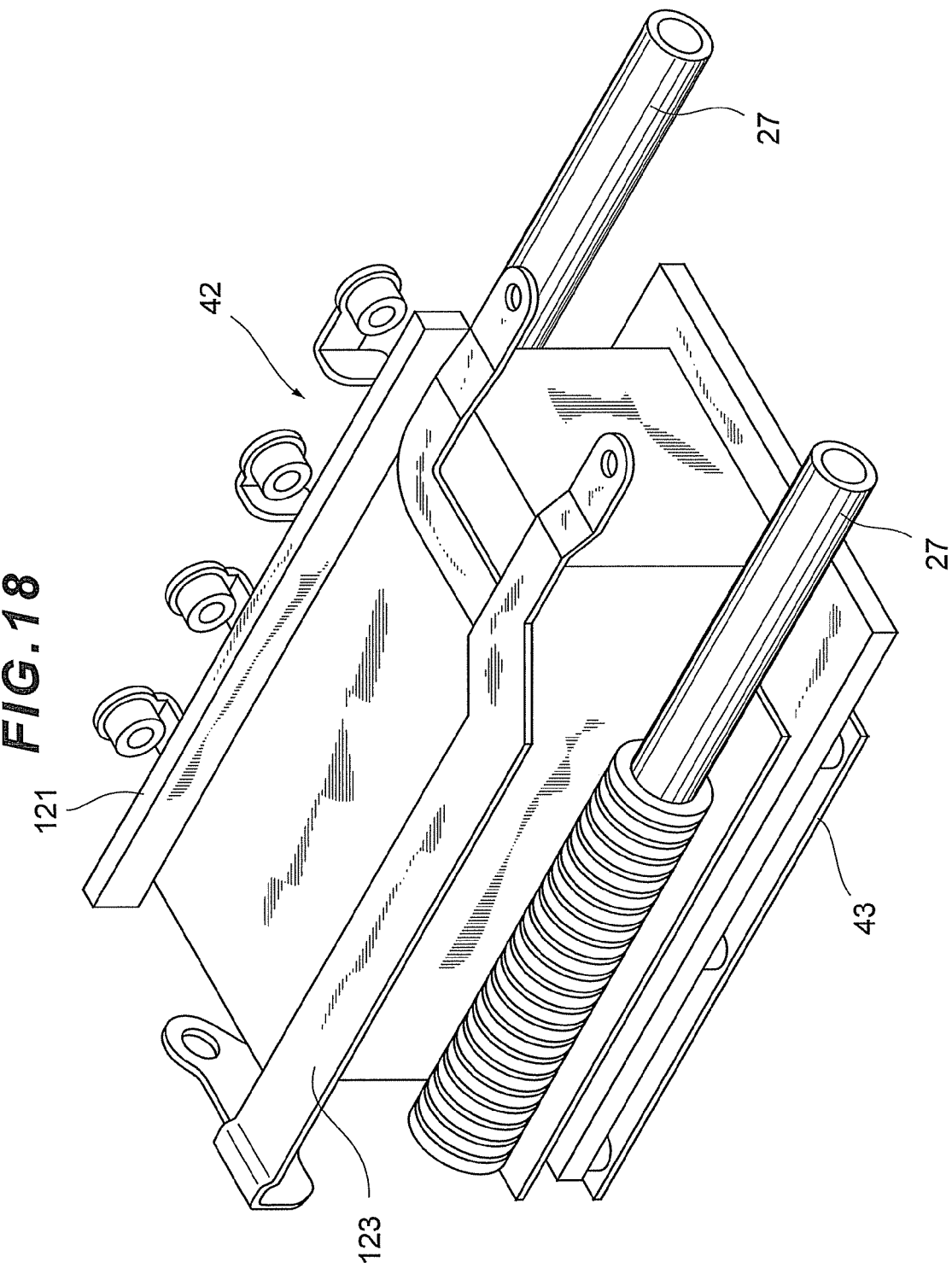
FIG. 18 is a perspective view of an IPM that constitutes the converter which is seen from the back surface side.
Figure 19:
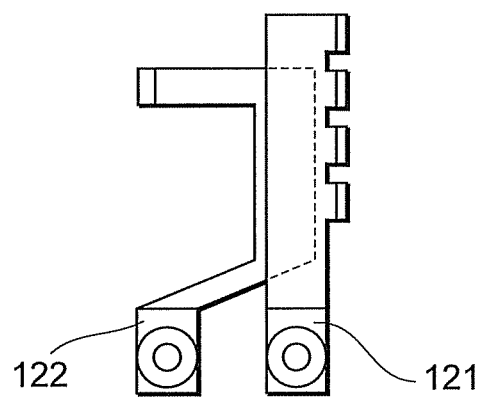
FIG. 19 is a view illustrating an arrangement of a P bus bar and an N bus bar of the IPM.
Figure 20:
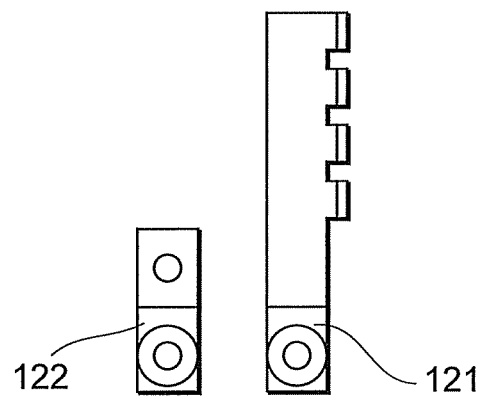
FIG. 20 is a view illustrating an arrangement of the P bus bar and the N bus bar of the IPM.

As shown in FIG. 18, the IPM 24 has the P bus bar 121 and an N bus bar 123, which are connected to the bus bars 93. As shown in FIG. 19, in terms of the surge voltage, a parallel arrangement section is generally provided by having the P bus bar 121 and the N bus bar 123 lap over each other in the height direction. However, when the connection point of the IPM 42 (N side) is provided on the fuel cell 21 side, as shown in FIG. 20, the P bus bar 121 and the N bus bar 123 do not need to be arranged in parallel regardless of the surge voltage. Therefore, lapping between the P bus bar 121 and the N bus bar 123 in the height direction can be eliminated, whereby the height dimension of the IPM 42 can be reduced.

As described above, according to the fuel cell vehicle V of this embodiment, the FC converter 23 contained in the center tunnel 15 is offset toward the fuel cell 21 relative to the tunnel centerline Y along the vehicle axis and is also offset toward the fluid supply/discharge unit 22 relative to the stack centerline Z along the vehicle axis, whereby the unit pipes 25, which lead to the radiator, compressor, etc., provided toward the front of the fuel cell vehicle V, can be provided to pass from the fluid supply/discharge unit 22. Further, the converter pipes 26 that lead to the FC converter 23 can be provided to pass on the side opposite the above piping space. Therefore, while the FC converter 23 is contained in the center tunnel 15, piping spaces for respectively providing the unit pipes 25 leading to the fluid supply/discharge unit 22 and the converter pipes 26 leading to the FC converter 23 can be ensured with balance on both sides of the FC converter 23.

Accordingly, the FC converter 23 can comfortably be contained in the center tunnel 15, and a large space inside the vehicle can be ensured.

What is claimed is:

1. A fuel cell vehicle, comprising under a floor of the vehicle:
   a fuel cell that generates electric power through an electrochemical reaction between reaction gases;
   a fluid supply/discharge unit for the fuel cell; and
   a converter that converts electric power from the fuel cell, the converter being contained in a center tunnel provided, at a center in a vehicle width direction, so as to be curved toward a cabin along a vehicle axis in a front-back direction, the fuel cell and the unit being arranged on a rear side of the vehicle relative to the converter and arranged in the vehicle width direction, wherein a floor of the vehicle comprises a protruded portion of a floor plate toward a cabin at a center in a vehicle width direction and a non-protruded portion of the floor plate, wherein the protruded portion of the floor plate forms a center tunnel along a vehicle axis in a front-back direction, wherein the converter is contained in the center tunnel, wherein a top surface of the converter is higher than the non-protruded portion of the floor plate, wherein the converter is provided to be offset toward the fuel cell with respect to a centerline of the center tunnel along the vehicle axis and to be offset toward the unit with respect to a centerline of the fuel cell along the vehicle axis, wherein at least one unit pipe extends in a forward direction of the vehicle from a front face of the unit, wherein the front face of the unit is directed in a forward direction of the vehicle, and wherein the at least one unit pipe is located substantially next to the converter and in front of the unit.

2. The fuel cell vehicle according to claim 1, wherein, in the converter, a reactor, a power module and a control substrate having a control circuit that controls the power module are arranged in order from below, and a power interrupting device is arranged in front of the vehicle.

3. The fuel cell vehicle according to claim 2, wherein a plurality of the reactors is arranged at intervals, and a cooling flow path is provided between the reactors.

4. The fuel cell vehicle according to claim 3, wherein a bus bar module integrated with bus bars connected to the reactors is provided on one side of the reactors, and the bus bar module is provided with a current sensor.

5. The fuel cell vehicle according to claim 4, wherein a coolant port for the cooling flow path is arranged opposite the bus bar module.

6. The fuel cell vehicle according to claim 3, wherein coolant distribution parts that distributes a coolant are provided outside coils that respectively constitute the reactors and on both sides in the vehicle width direction.

7. The fuel cell vehicle according to claim 1, wherein a cross member of the vehicle is arranged above a joining part between the converter and the fuel cell.

8. The fuel cell vehicle according to claim 1, wherein the converter is formed to taper down, at least on a side opposite a joining side with the fuel cell, toward a longitudinal direction end of the converter.

9. The fuel cell vehicle according to claim 2, wherein the reactors are energized beginning with a lowest-temperature reactor.

10. The fuel cell vehicle according to claim 2, wherein the reactors are energized beginning with a highest-temperature reactor.

11. The fuel cell vehicle according to claim 2, wherein a reactor at a temperature with which copper loss of the reactor is a minimum and efficiency of the power module is a maximum is selected to be energized.

12. The fuel cell vehicle according to claim 3, comprising a reactor block in which: one or more of the reactors are provided to a reactor case while a part(s) thereof is being exposed to the outside; and cooling fins are provided to a surface of the reactor case which is located opposite a surface thereof on which the reactor(s) is exposed.

13. The fuel cell vehicle according to claim 12, wherein the cooling fins of a plurality of the reactor blocks are arranged opposite each other, and the cooling flow path is formed between the cooling fins.

14. The fuel cell vehicle according to claim 9, comprising a reactor block in which: one or more of the reactors are provided to a reactor case while a part(s) thereof is being exposed to the outside; and cooling fins are provided to a surface of the reactor case which is located opposite a surface thereof on which the reactor(s) is exposed.

15. The fuel cell vehicle according to claim 14, wherein the cooling fins of a plurality of the reactor blocks are arranged opposite each other, and the cooling flow path is formed between the cooling fins.

* * * * *